US010502985B2

(12) United States Patent
Kawata

(10) Patent No.: US 10,502,985 B2
(45) Date of Patent: Dec. 10, 2019

(54) DISPLAY DEVICE

(71) Applicant: Japan Display Inc., Minato-ku (JP)

(72) Inventor: Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/041,008

(22) Filed: Jul. 20, 2018

(65) Prior Publication Data

US 2019/0033628 A1 Jan. 31, 2019

(30) Foreign Application Priority Data

Jul. 26, 2017 (JP) ................. 2017-144584

(51) Int. Cl.
*G02F 1/01* (2006.01)
*G02F 1/1333* (2006.01)
*G02F 1/1339* (2006.01)

(52) U.S. Cl.
CPC ........ *G02F 1/0107* (2013.01); *G02F 1/13394* (2013.01); *G02F 1/133345* (2013.01)

(58) Field of Classification Search
CPC .................................................. G02F 1/0107
See application file for complete search history.

(56) References Cited

U.S. PATENT DOCUMENTS

| 2003/0071956 | A1* | 4/2003 | Sasaki | G02F 1/13394 349/155 |
| 2010/0165278 | A1* | 7/2010 | Matsumori | G02F 1/13394 349/123 |
| 2010/0201934 | A1* | 8/2010 | Fan | G02F 1/13394 349/153 |
| 2013/0155367 | A1* | 6/2013 | Tomioka | G02F 1/1339 349/155 |
| 2013/0235294 | A1* | 9/2013 | Nomura | G02F 1/1339 349/43 |
| 2015/0098048 | A1* | 4/2015 | Tomioka | G02F 1/133512 349/106 |
| 2016/0004114 | A1* | 1/2016 | Kuramoto | G02F 1/13394 349/43 |
| 2016/0202514 | A1* | 7/2016 | Li | G02F 1/1339 349/106 |
| 2016/0238894 | A1* | 8/2016 | Choi | G02F 1/133603 |
| 2017/0059915 | A1* | 3/2017 | Kobayashi | G02F 1/13394 |

(Continued)

FOREIGN PATENT DOCUMENTS

| JP | 2003-121859 | 4/2003 |
| JP | 2004-126197 | 4/2004 |

(Continued)

*Primary Examiner* — Sang V Nguyen
(74) *Attorney, Agent, or Firm* — Oblon, McClelland, Maier & Neustadt, L.L.P.

(57) ABSTRACT

According to one embodiment, a display device including a first substrate, a second substrate, a sealant, and a spacer, wherein the first substrate and the second substrate in an area surrounded by the sealant includes a first area and a second area located between the sealant and the first area, the spacer includes a plurality of first spacers located in the first area and a plurality of second spacers located in the second area, the first spacers are located at a first distance from each other in a first direction, the second spacers are located at a second distance from each other in the first direction, and the second distance is less than the first distance.

7 Claims, 28 Drawing Sheets

(56) References Cited

U.S. PATENT DOCUMENTS

2017/0160766 A1* 6/2017 Gupta .................... G06F 1/1605
2017/0352713 A1* 12/2017 Lin ....................... H01L 51/525
2018/0348555 A1* 12/2018 Okita .................... G02F 1/1339
2018/0348556 A1* 12/2018 Jin ....................... G02F 1/1339

FOREIGN PATENT DOCUMENTS

| | | |
|---|---|---|
| JP | 2011-022535 | 2/2011 |
| JP | 2015-075606 | 4/2015 |
| JP | 2016-014777 | 1/2016 |

* cited by examiner

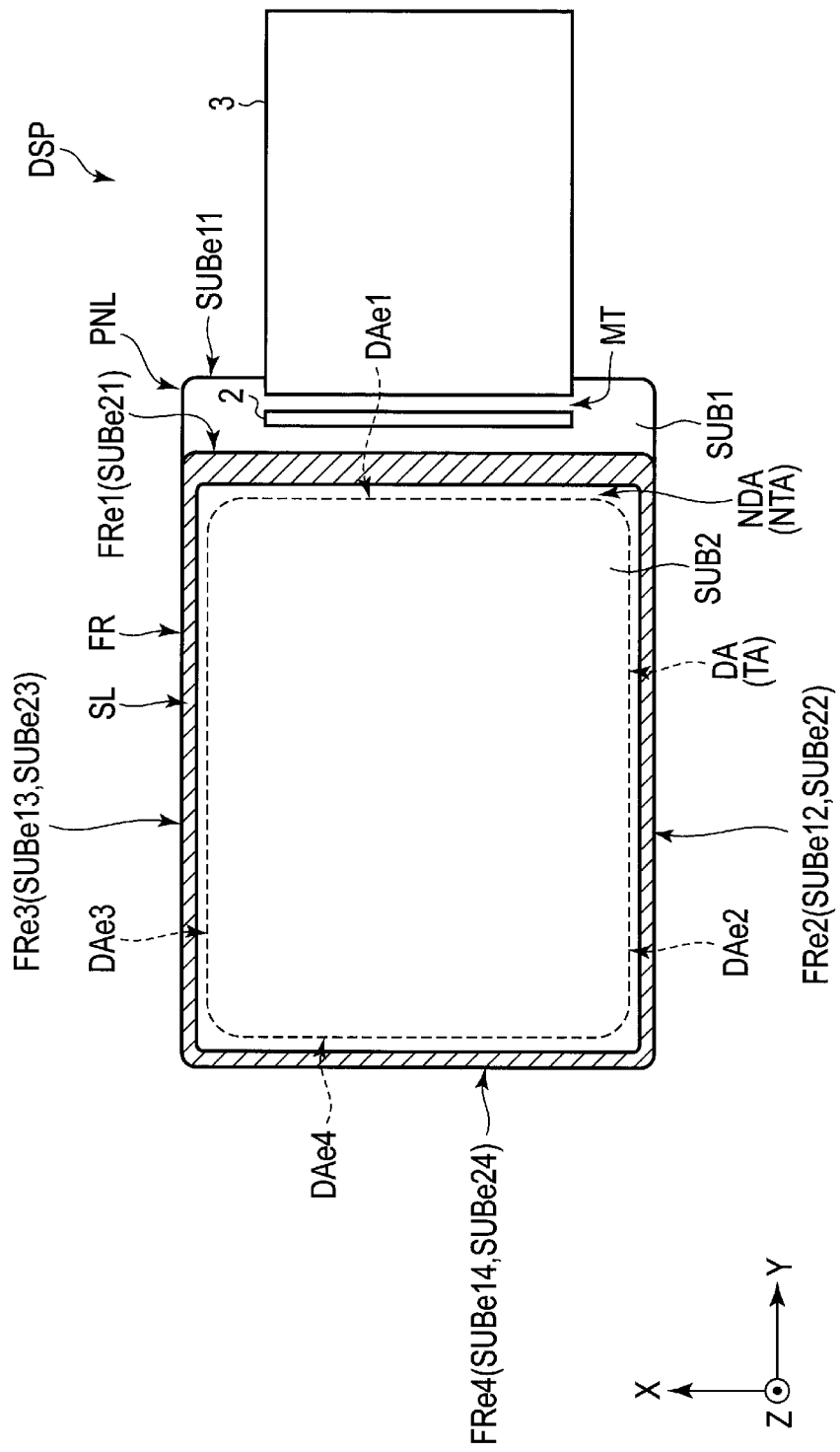
F I G. 1

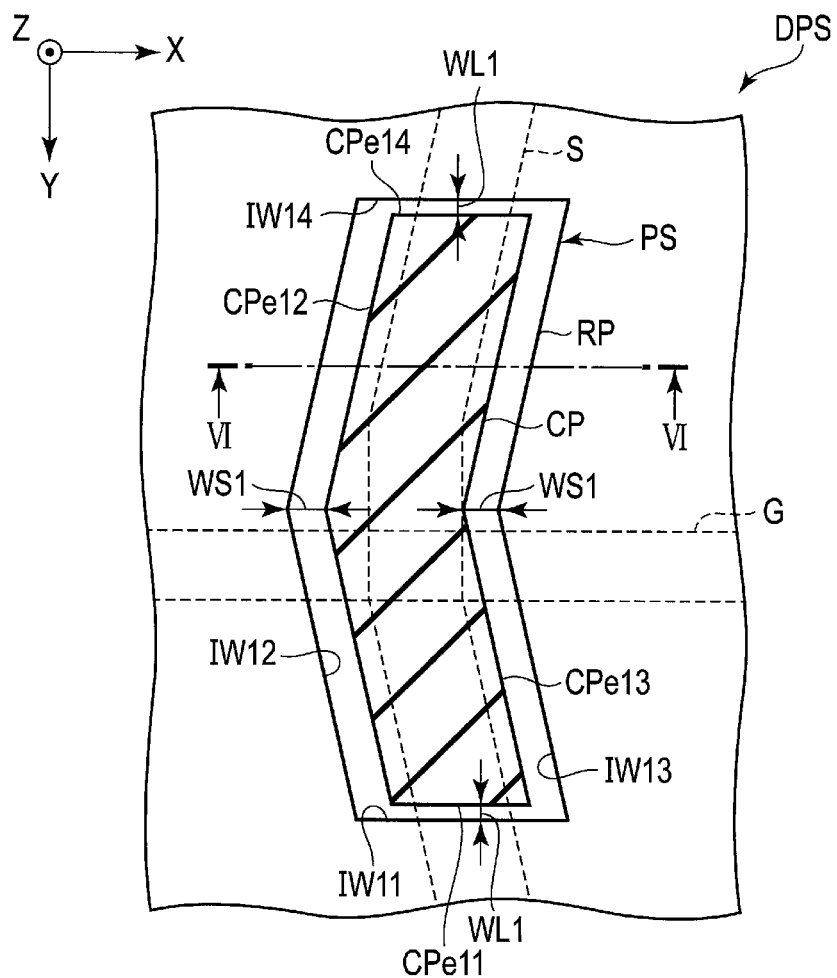
F I G. 5

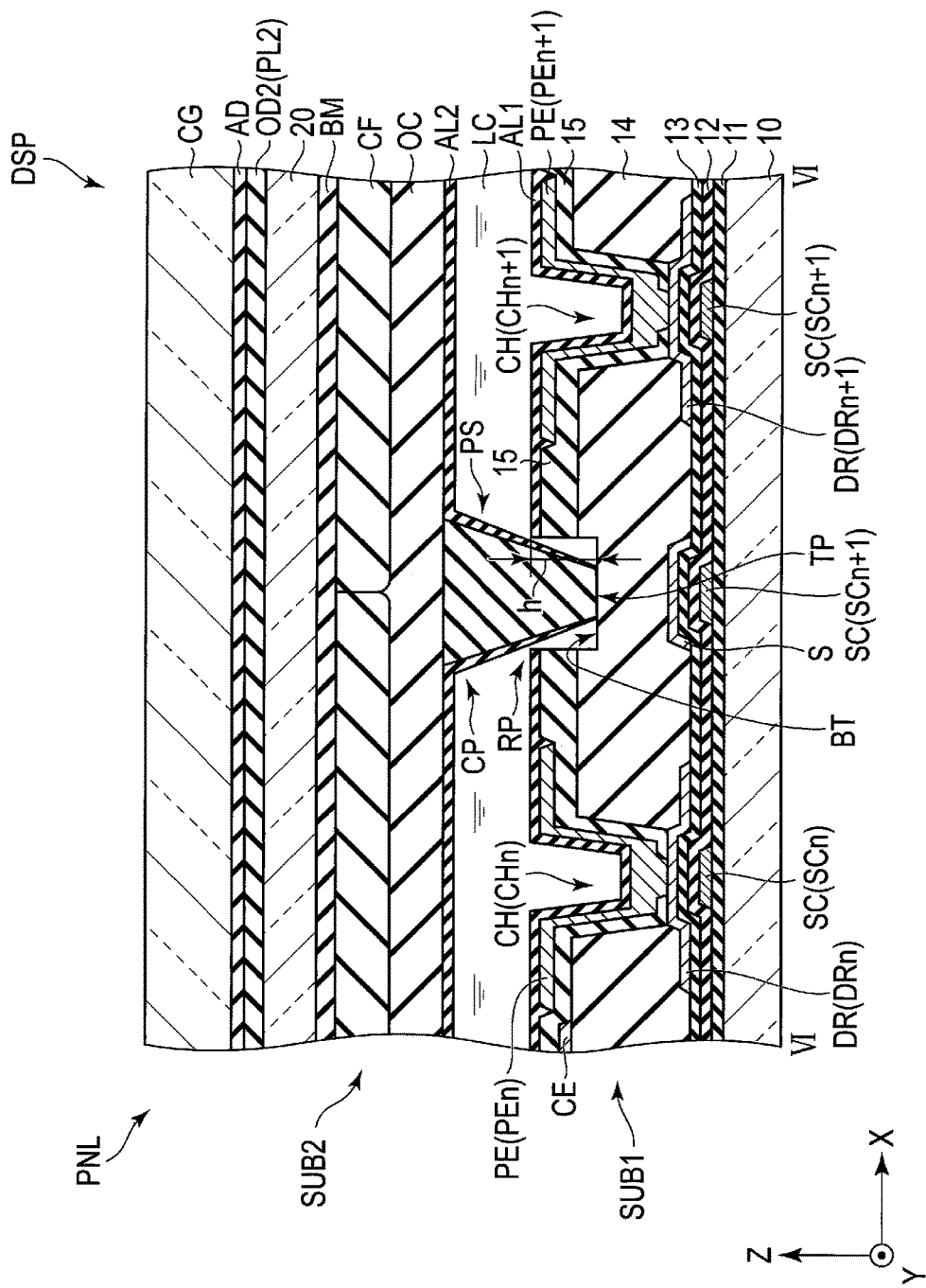
F I G. 6

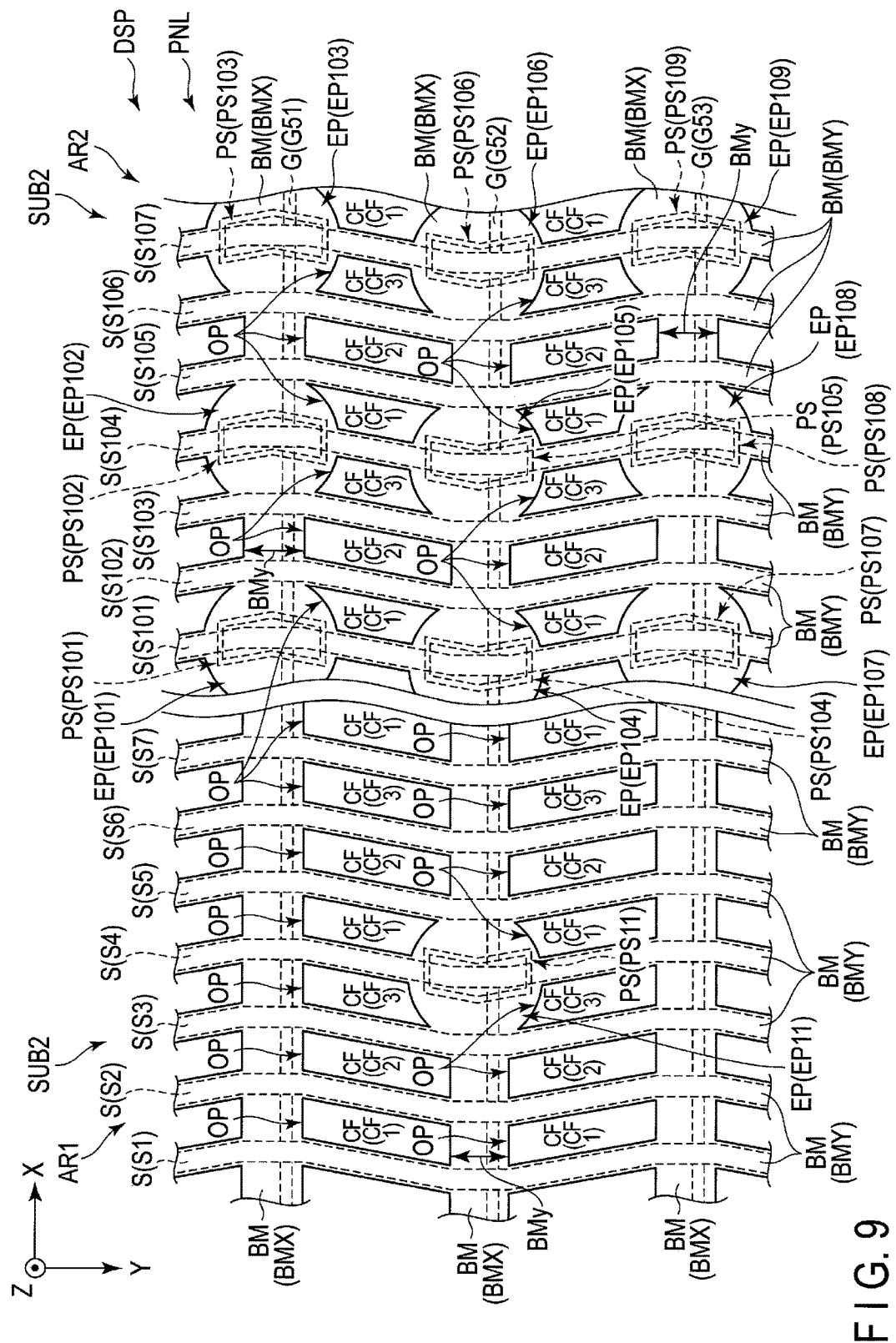
F I G. 9

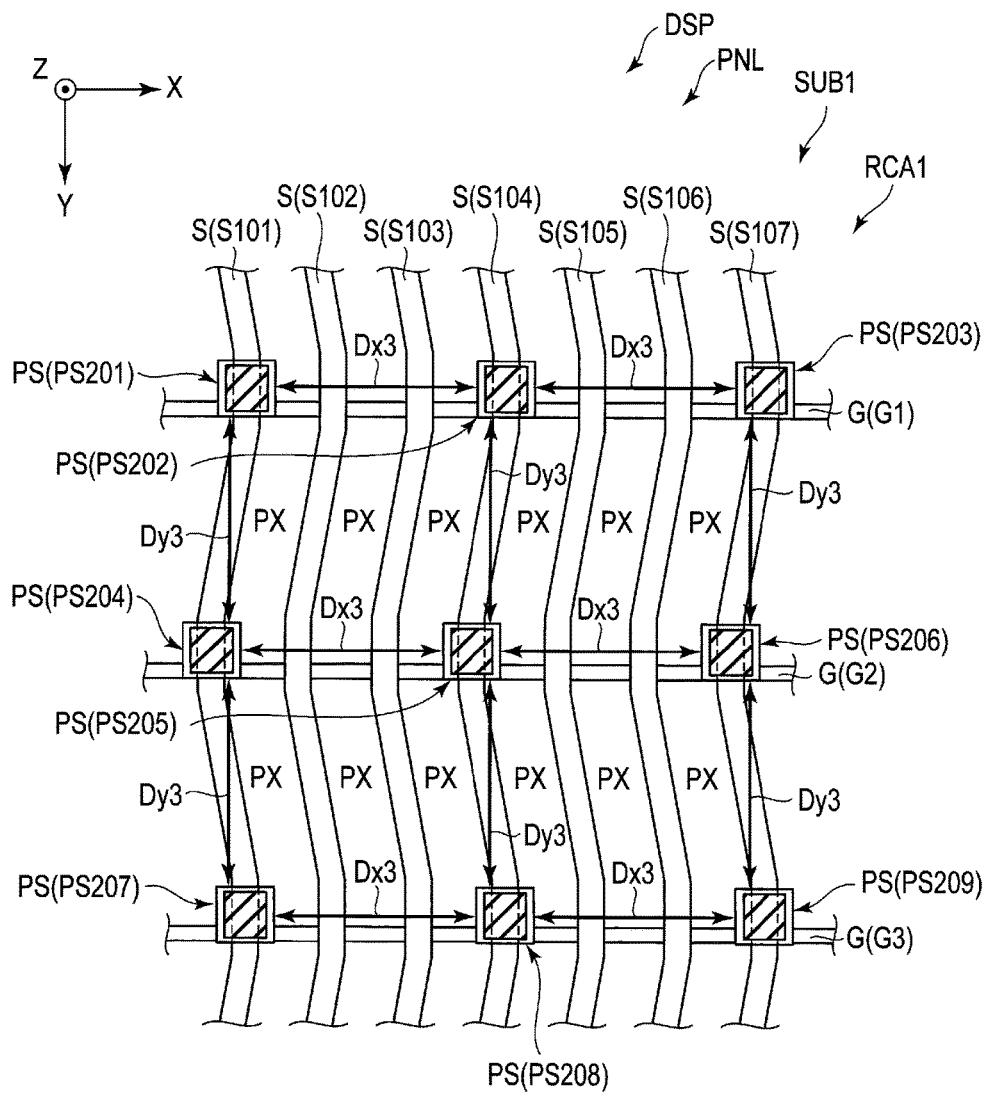
F I G. 13

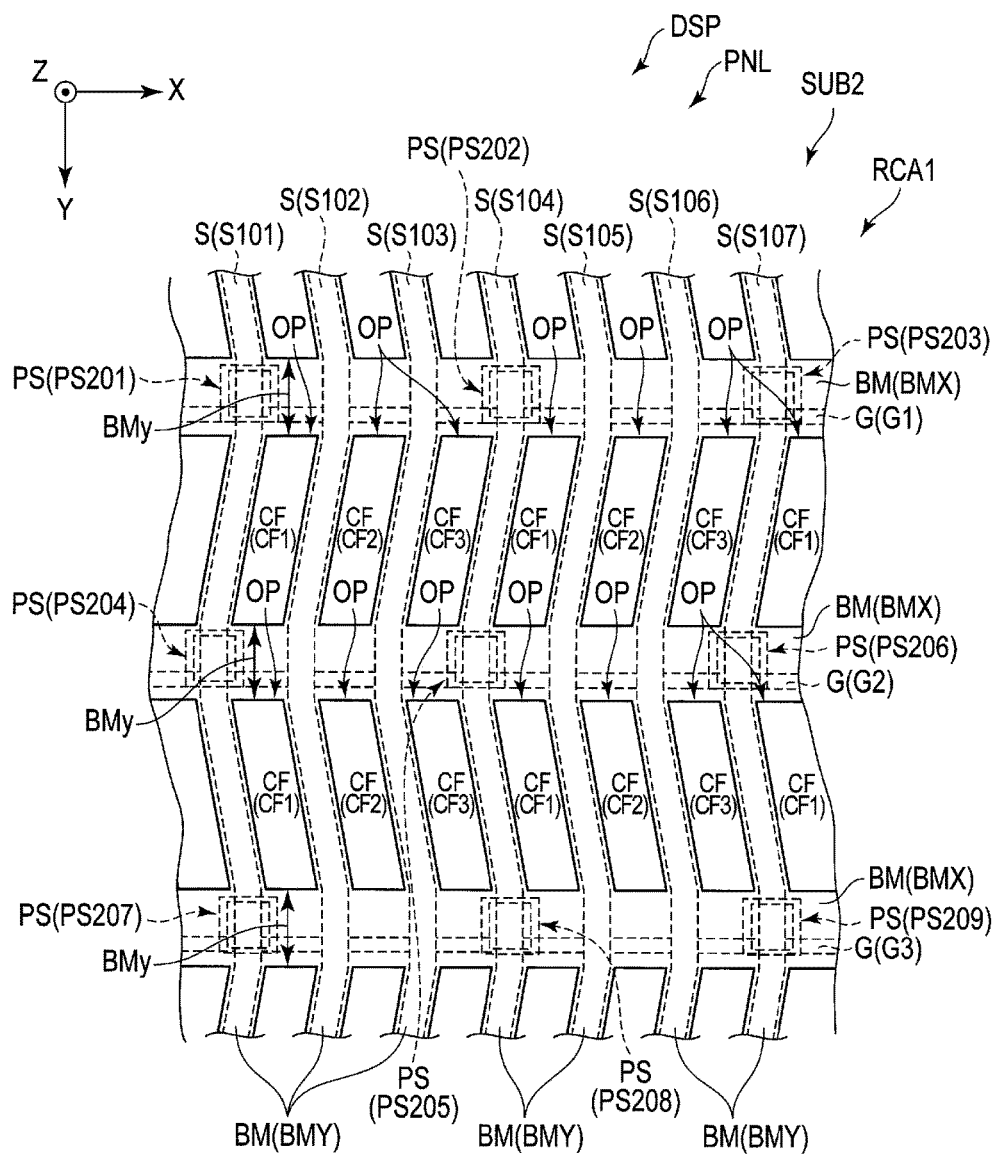
F I G. 14

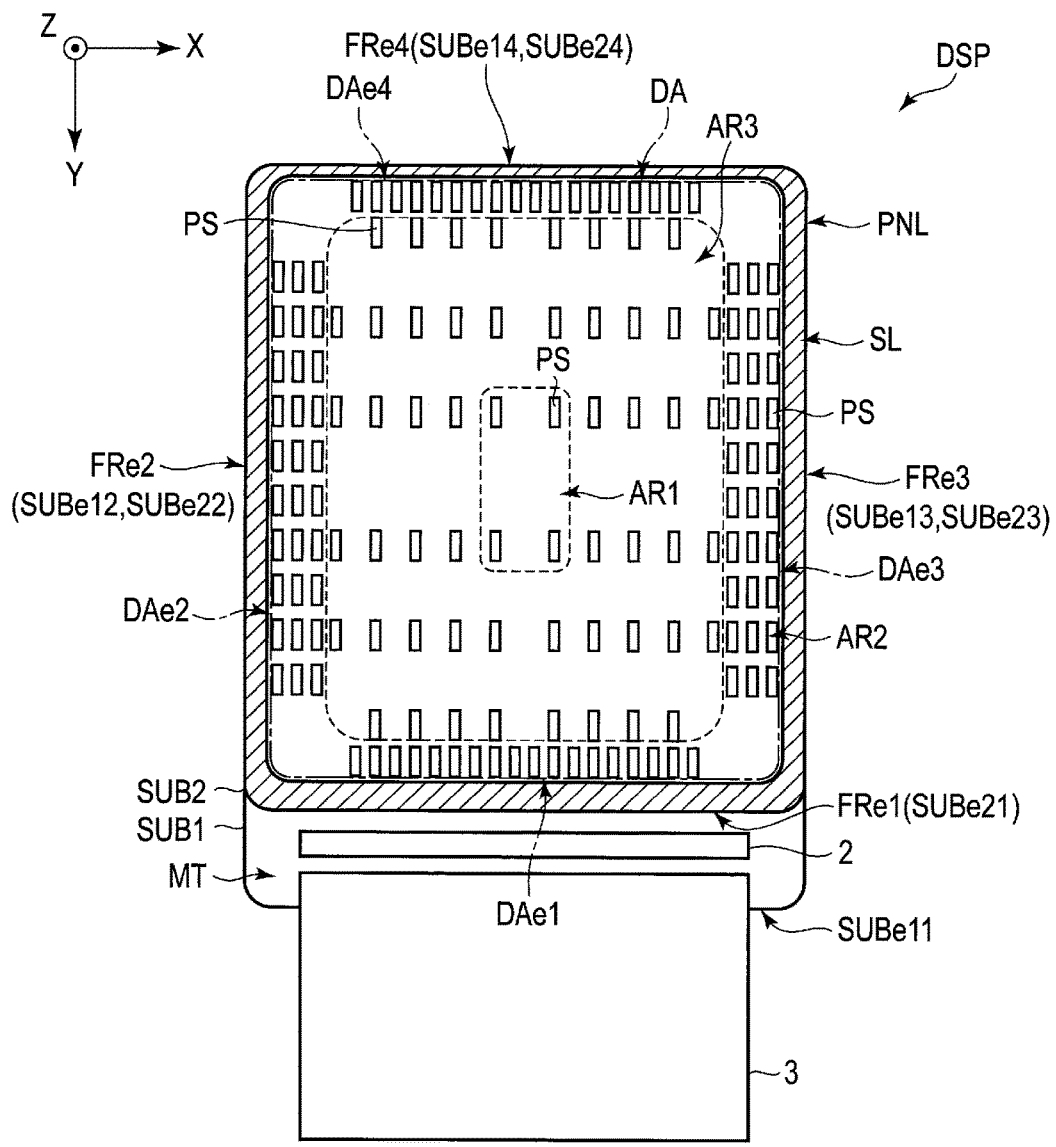
F I G. 15

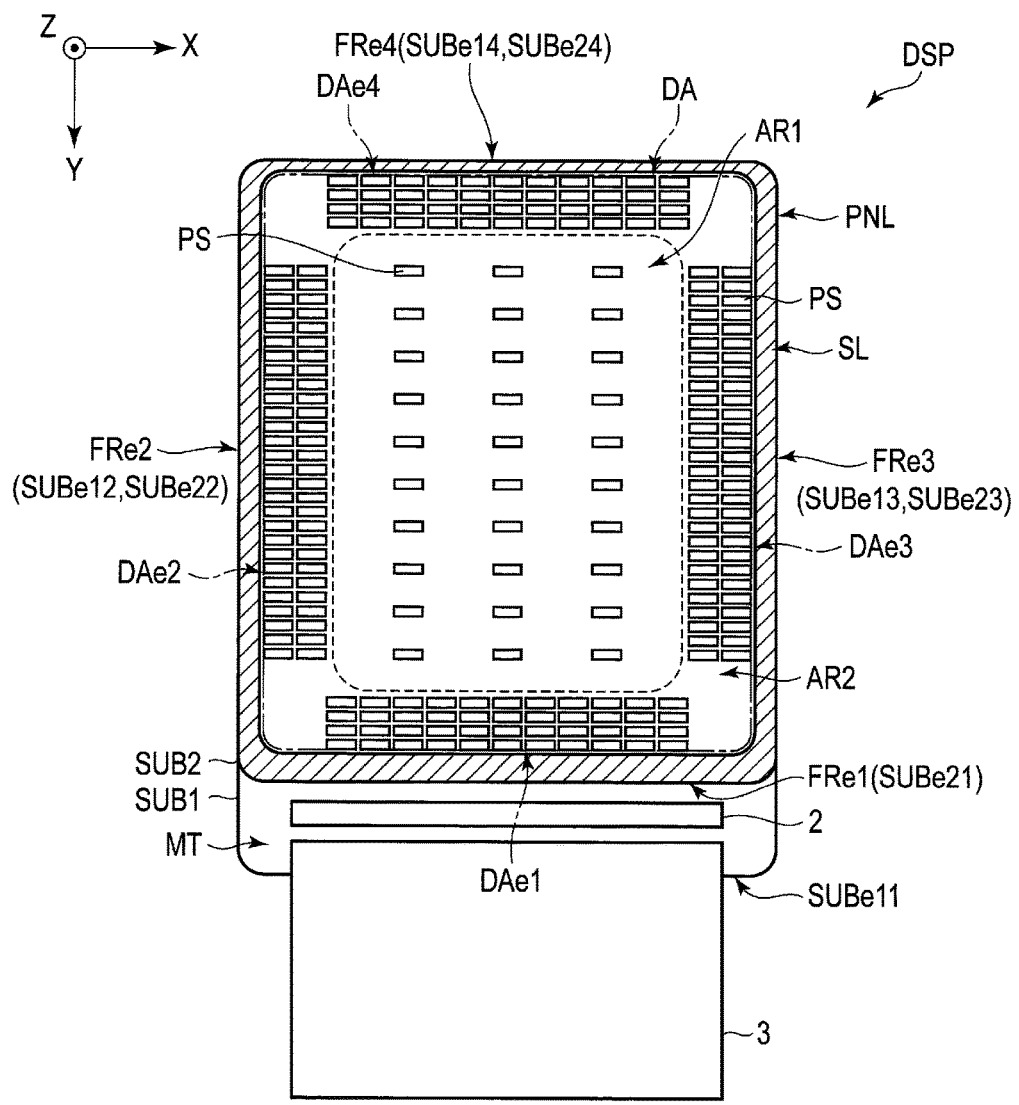
F I G. 17

DISPLAY DEVICE

CROSS-REFERENCE TO RELATED APPLICATIONS

This application is based upon and claims the benefit of priority from Japanese Patent Application No. 2017-144584, filed Jul. 26, 2017, the entire contents of which are incorporated herein by reference.

FIELD

Embodiments described herein relate generally to a display device.

BACKGROUND

A display device having a sheet-like display panel has been under consideration. The display panel is flexible, and includes a first substrate and a second substrate which are opposed to each other and a liquid crystal layer and a spacer which are located between the first substrate and the second substrate. The display panel is composed of the first substrate and the second substrate which are attached together while sandwiching the spacer. In such a display panel, as compared to a display panel composed of two rigid substrates which are attached together, the first substrate and the second substrate are more likely to be displaced from each other. If the first substrate and the second substrate are displaced from each other, the spacer may rub against an alignment film provided in the first substrate or the second substrate and may damage the alignment film. In a portion of the alignment film which is rubbed and damaged by the spacer, liquid crystal molecules will be misaligned. The misalignment of liquid crystal molecules may cause leakage of light, and the leakage of light may lead to reduction of the contrast ratio.

BRIEF DESCRIPTION OF THE DRAWINGS

FIG. 1 is a diagram showing a configuration example of a display panel constituting a display device of the first embodiment.

FIG. 5 is a plan view showing a configuration example of a spacer according to the first embodiment.

FIG. 6 is a sectional view showing a configuration example of the spacer constituting the display device taken along line VI-VI shown in FIG. 5.

FIG. 9 is a plan view showing a configuration example of a light-shielding layer and a color filter according to the first embodiment.

FIG. 13 is a plan view showing a configuration example of a corner area of a display panel according to modification 1.

FIG. 14 is a plan view showing a configuration example of a light-shielding layer and a color filter according to modification 1.

FIG. 15 is a plan view showing a configuration example of a display panel according to modification 2.

FIG. 17 is a plan view showing a configuration example of a display panel according to the second embodiment.

DETAILED DESCRIPTION

Figure 2:
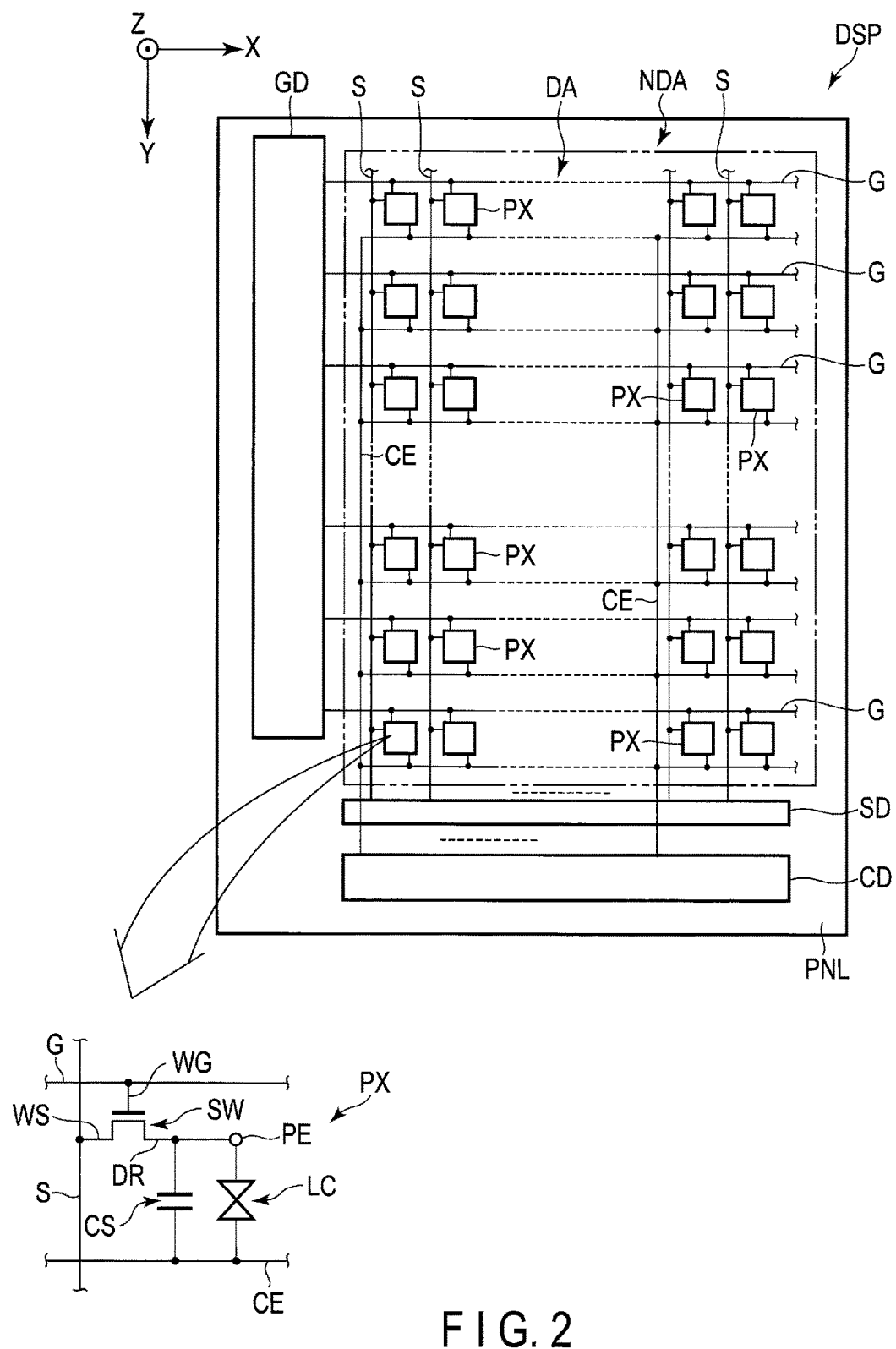
FIG. 2 is a diagram showing the basic configuration and equivalent circuit of the display panel shown in FIG. 1.

In general, according to one embodiment, a display device comprises: a first substrate; a second substrate opposed to the first substrate; a sealant which attaches the first substrate and the second substrate together; and a spacer located between the first substrate and the second substrate, wherein the first substrate and the second substrate in an area surrounded by the sealant comprises a first area and a second area located between the sealant and the first area, the spacer is formed of a recess and a projection opposed to the recess, and includes a plurality of first spacers located in the first area and a plurality of second spacers located in the second area, the first spacers are located at a first distance from each other in a first direction, the second spacers are located at a second distance from each other in the first direction, and the second distance is less than the first distance.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the embodiments, a display device will be disclosed as an example of an electronic device. The display device can be used in various devices such as smartphones, tablet computers, mobile phones, notebook computers, game consoles and virtual reality (VR) viewers. A display device DSP will be described as a liquid crystal display device below.

FIG. 1 is a diagram showing a configuration example of a display panel PNL constituting the display device DSP of the first embodiment. The display panel PNL will be described as a sheet-like flexible display panel below. The display panel PNL is not necessarily a sheet-like flexible display panel.

Here, FIG. 1 shows a plan view of the display panel PNL in an X-Y plane defined by a first direction X and a second direction Y which intersect each other. The first direction X and the second direction Y orthogonally intersect each other in the example illustrated but may intersect each other at an angle other than an angle of 90°. The direction of a pointing end of an arrow indicating the first direction X may be hereinafter referred to as right, and the opposite direction to the pointing end of the arrow may be hereinafter referred to as left.

The display panel PNL includes a first substrate SUB1 and a second substrate SUB2 opposed to the first substrate SUB1. The first substrate SUB1 and the second substrate SUB2 are flexible substrates. In the example illustrated, the first substrate SUB1 and the second substrate SUB2 have a rounded shape having rounded corners. The first substrate SUB1 and the second substrate SUB2 may have a rectangular shape instead.

One substrate side edge SUBe11 of the first substrate SUB1 is located on the outside of one substrate side edge SUBe21 of the second substrate SUB2. In other words, the first substrate SUB1 has a mounting portion MT which extends outward in the second direction Y beyond the substrate side edge SUBe21 of the second substrate SUB2. The substrate side edges SUBe11 and SUBe21 are formed substantially parallel to each other in the first direction X. Other three substrate side edges SUBe12, SUBe13 and SUBe14 of the first substrate SUB1 are opposed to other three substrate side edges SUBe22, SUBe23 and SUBe24 of the second substrate SUB2, respectively.

In the display panel PNL, an area in which the first substrate SUB1 and the second substrate SUB2 are opposed to each other will be hereinafter referred to as an opposed area FR. The opposed area FR is surrounded by an edge FRe1 opposed to the substrate side edge SUBe21, an edge FRe2 opposed to the substrate side edge SUBe12 and the substrate side edge SUBe22, an edge FRe3 opposed to the substrate side edge SUBe13 and the substrate side edge SUBe23, and an edge FRe4 opposed to the substrate side edge SUBe14 and the substrate side edge SUBe24.

The first substrate SUB1 and the second substrate SUB2 are attached together with a sealant SL with a predetermined cell gap formed therebetween. The sealant SL is located within the opposed area FR. In the example illustrated, the sealant SL is formed in a rounded shape and is arranged along four edges FRe1 to FRe4 of the opposed area FR. The sealant SL may be formed in a rectangular shape instead.

The display panel PNL has a display area DA and a non-display area NDA. In the example illustrated, the display area DA is located on the inside surrounded by the sealant SL. The display area DA has a rounded shape, for example. The display area DA is surrounded by four edges DAe1, DAe2, DAe3 and DAe4. The edges DAe1 to DAe4 are arranged along the inside of the sealant SL. The edges DAe1 and DAe4 are opposed to the edges FRe1 and FRe4, respectively, in the second direction Y. The edges DAe2 and DAe3 are opposed to the edges FRe2 and FRe3, respectively, in the first direction X. The display area DA may have a rectangular shape or may have another polygonal shape. The non-display area NDA is located on the outside of the display area DA. The sealant SL is arranged in the non-display area NDA. The second substrate SUB2 has a light transmissive area TA which is an area overlapping the display area DA in a plan view, and a non-transmissive area NTA which is an area overlapping the non-display area NDA in a plan view. Here, a light-shielding member such as a wiring line may be arranged in the light transmissive area TA.

The display panel PNL may be configured as a transmissive display panel which displays an image by selectively transmitting light which is emitted from a backlight unit arranged on a rear surface side thereof which will be described later, may be configured as a reflective display panel which displays an image by selectively reflecting external light which enters the display panel PNL, or may be configured as a transflective display panel which is a combination of the transmissive display panel and the reflective display panel.

Signal supply sources such as a driver IC chip 2 and a flexible printed circuit (FPC) board 3 necessary for driving the display panel PNL are located in the non-display area NDA. In the example illustrated, the driver IC chip 2 and the FPC board 3 are mounted on the mounting portion MT of the first substrate SUB1. Although not shown in the drawing, the first substrate SUB1 includes connection terminals (hereinafter referred to as pads) which connect the signal supply sources to the mounting portion MT. The pads may be electrically connected to signal lines, scanning lines, etc., which will be described later.

FIG. 2 is a diagram showing the basic configuration and equivalent circuit of the display panel PNL shown in FIG. 1.

The display panel PNL includes a plurality of subpixels PX in the display area DA. The pixels PX are arranged in a matrix in the first direction X and the second direction Y within the display area DA. The subpixel here indicates the smallest unit which can be controlled individually according to a pixel signal and is provided, for example, in an area which includes a switching element arranged at the intersection of a scanning line and a signal line which will be described later. For example, one pixel is composed of a subpixel corresponding to red, a subpixel corresponding to green and a subpixel corresponding to blue. The pixel corresponds to the smallest unit of an image displayed in the display area DA.

Further, the display panel PNL includes a plurality of scanning lines G, a plurality of signal lines S, a common electrode CE, etc., in the display area DA. The signal lines S extend in the second direction Y and are arranged in the first direction X. The scanning lines G extend in the first direction X and are arranged in the second direction Y. The scanning line G and the signal line S may be formed of a metal material such as aluminum (Al), titanium (Ti), silver (Ag), molybdenum (Mo), tungsten (W), copper (Cu) or chromium or an alloy of a combination of these metal materials, and may have a single layer structure or a multilayer structure. The scanning line G and the signal line S may not extend linearly but may be partially crooked.

The common electrode CE is arranged across the plurality of pixels PX. The scanning line G, the signal line S and the common electrode CE are drawn out to the non-display area NDA. In the non-display area NDA, the scanning line G is connected to a scanning line drive circuit GD, the signal line S is connected to the signal line drive circuit SD, and the common electrode CE is connected to a common electrode drive circuit CD. The signal line drive circuit SD, the scanning line drive circuit GD and the common electrode drive circuit CD may be partially or entirely incorporated in the IC chip 2 shown in FIG. 1 or may be formed on the first substrate SUB1.

Each subpixel PX includes a switching element SW, a pixel electrode PE, the common electrode CE, a liquid crystal layer LC, etc. The switching element SW is composed, for example, of a thin-film transistor (TFT) and is electrically connected to the scanning line G and the signal line S. More specifically, the switching element SW includes a gate electrode WG, a source electrode WS and a drain electrode RD. The gate electrode WG is electrically connected to the scanning line G. In the example illustrated, an electrode electrically connected to the signal line S is referred to as the source electrode WS, and an electrode electrically connected to the pixel electrode PE is referred to as the drain electrode RD.

The scanning line G is connected to the respective switching elements SW of the pixels PX arranged in the first direction X. The signal line S is connected to the respective switching elements SW of the pixels PX arranged in the second direction Y. Each pixel electrode PE is opposed to the common electrode CE, and the liquid crystal layer LC is driven by an electric field produced between the pixel electrode PE and the common electrode CE. Storage capacitance CS is formed, for example, between the common electrode CE and the pixel electrode PE.

Figure 3:
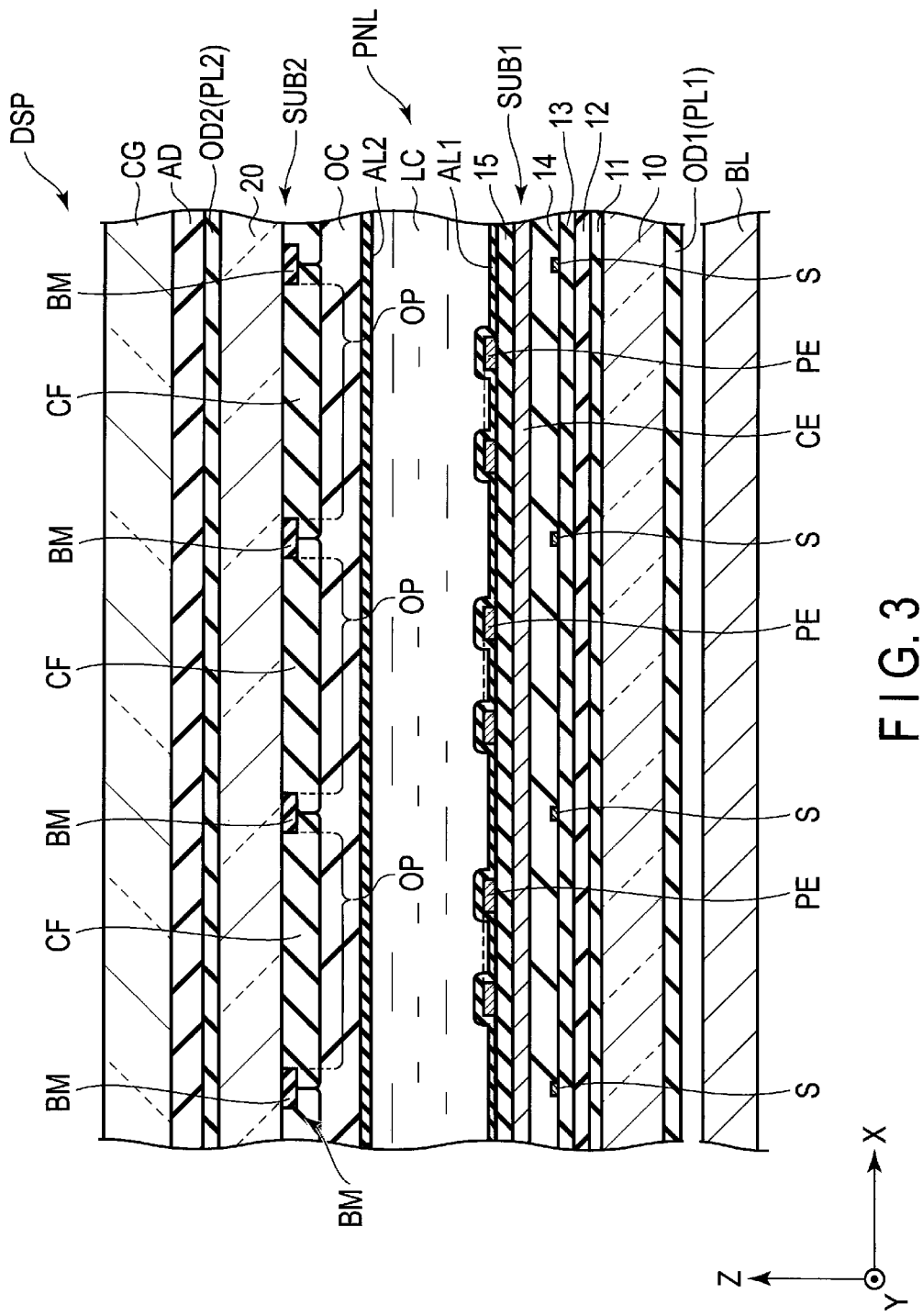
FIG. 3 is a sectional view showing a part of the structure of the display device shown in FIG. 1.

FIG. 3 is a sectional view showing the structure of a part of the display device DSP shown in FIG. 1. In the following, the direction of the pointing end of the arrow indicating the third direction Z is defined as above, and the opposite direction to the pointing end of the arrow is defined as below. Such descriptions as "the second member above the first member" and "the second member below the first member" may include both a case where the second member is in contact with the first member and a case where the second member is away from the first member. Further, a view toward the X-Y plane defined by the first direction X and the second direction Y from above in the third direction Z is referred to as a plan view.

The display device DSP includes a backlight unit BL, the display panel PNL and a cover member CG.

The display panel PNL includes the first substrate SUB1, the liquid crystal layer LC and the second substrate SUB2 arranged in this order in the third direction Z. The first substrate SUB1 includes a first insulating substrate 10, a first insulating film 11, a second insulating film 12, a third insulating film 13, a fourth insulating film 14, a fifth insulating film 15, the signal line S, the common electrode CE, the pixel electrode PE, a first alignment film AL1, etc. For example, the first insulating film 11, the second insulating film 12, the third insulating film 13 and the fifth insulating film 15 are inorganic insulating films formed of silicon oxide, silicon nitride, silicon oxynitride, etc. For example, the fourth insulating film 14 is an organic insulating film formed of acrylic resin. The first insulating film 11, the second insulating film 12, the third insulating film 13 and the fifth insulating film 15 may have a single layer structure or may have a multilayer structure.

The first insulating substrate 10 is a light transmissive substrate. For example, the first insulating substrate 10 is a flexible substrate. For example, the first insulating substrate 10 is a resin substrate formed of polyimide, etc. The first insulating film 11 is located above the first insulating substrate 10. The second insulating film 12 is located above the first insulating film 11. The third insulating film 13 is located above the second insulating film 12.

The signal line S is located above the third insulating film 13 and is covered with the fourth insulating film 14. In the example illustrated, the signal lines S are arranged at intervals in the first direction X above the third insulating film 13.

The common electrode CE is located above the fourth insulating film 14. The fifth insulating film 15 is located above the common electrode CE. The pixel electrode PE is located above the fifth insulating film 15 and is covered with the first alignment film AL1. The pixel electrode PE is opposed to the common electrode CE via the fifth insulating film 15. The common electrode CE and the pixel electrode PE are formed of a transparent conductive material such as indium tin oxide (ITO) or indium zinc oxide (IZO). In the example illustrated, the pixel electrodes PE are arranged at intervals in the first direction X above the fifth insulating film 15. The first alignment film AL1 is located on the fifth insulating film 15 and the pixel electrode PE.

The second substrate SUB2 includes a second insulating substrate 20, a light-shielding layer BM, a color filter CF, an overcoat layer OC, a second alignment film AL2, etc. In the example illustrated, the second substrate SUB2 is located on the first substrate SUB1 and is opposed to the first substrate SUB1.

The second insulating substrate 20 is a light transmissive substrate. For example, the second insulating substrate 20 is a flexible substrate. For example, the second insulating substrate 20 is a resin substrate formed of polyimide, etc.

The light-shielding layer BM is located below the second insulating substrate 20 and is covered with the color filter CF. Further, the light-shielding layer BM is located directly above the signal line S. In the example illustrated, the light-shielding layer BM is arranged at intervals in the first direction X below the second insulating substrate 20. An opening OP is partitioned with the light-shielding layer BM. In the example illustrated, the opening OP is located between two light-shielding layers BM which are adjacent to each other in the first direction X.

The color filter CF covers the second insulating substrate 20 and a part of the light-shielding layer BM and covers the opening OP. A part of the color filter CF overlaps a part of the light-shielding layer BM. The color filter CF is located above the pixel electrode PE. The overcoat layer OC covers the color filter CF. The second alignment film AL2 covers the overcoat layer OC.

A predetermined cell gap is formed between the first alignment film AL1 and the second alignment film AL2. The cell gap is, for example, 2 to 5 µm. The first substrate SUB1 and the second substrate SUB2 are attached together with the previously-mentioned sealant with the predetermined cell gap formed therebetween.

The liquid crystal layer LC is held in the cell gap formed between the first substrate SUB1 and the second substrate SUB2. In the example illustrated, the liquid crystal layer LC is held between the first alignment film AL1 and the second alignment film AL2. The liquid crystal layer LC contains liquid crystal molecules. The liquid crystal layer LC is formed of a positive liquid crystal material (having a positive dielectric anisotropy) or a negative liquid crystal material (having a negative dielectric anisotropy).

With respect to the display panel PNL of the above-described configuration, a first optical element OD1 including a first polarizer PL1 is arranged below the first substrate SUB1. Further, a second optical element OD2 including a second polarizer PL2 is arranged above the second substrate SUB2. In the example illustrated, the first optical element OD1 is arranged below the first insulating substrate 10, and the second optical element OD2 is arranged above the second insulating substrate 20. For example, the first polarizer PL1 and the second polarizer PL2 are arranged such that absorption axes thereof orthogonally intersect each other in the X-Y plane. Each of the first optical element OD1 and the second optical element OD2 may include a retarder such as a quarter-wave retarder or half-wave retarder, a scattering layer, and an antireflective layer as needed.

The cover member CG is located above the second substrate SUB2. The cover member CG is formed of, for example, glass but may be formed of resin. The cover member CG is attached to the second substrate SUB2 with an adhesive AD. In the example illustrated, the cover member CG is attached to the second optical element OD2 with the adhesive AD. Some layers other than the adhesive AD may be arranged between the cover member CG and the second optical element OD2.

In the display device DSP according to this configuration example, the liquid crystal molecules contained in the liquid crystal layer LC are initially aligned in a predetermined direction between the first alignment film AL1 and the second alignment film AL2 in an off state where an electric field is not formed between the pixel electrode PE and the common electrode CE. In the off state, light emitted from the backlight unit BL to the display panel PNL is absorbed by the first optical element OD1 and the second optical element OD2, and dark display is executed. On the other hand, in an on state in which an electric field is formed between the pixel electrode PE and the common electrode CE, the liquid crystal molecules are aligned in a direction different from the initial alignment direction by the electric field, and the alignment direction is controlled by the electric field. In the on state, light emitted from the backlight unit BL is partially transmitted through the first optical element OD1 and the second optical element OD2, and bright display is executed.

Figure 4:
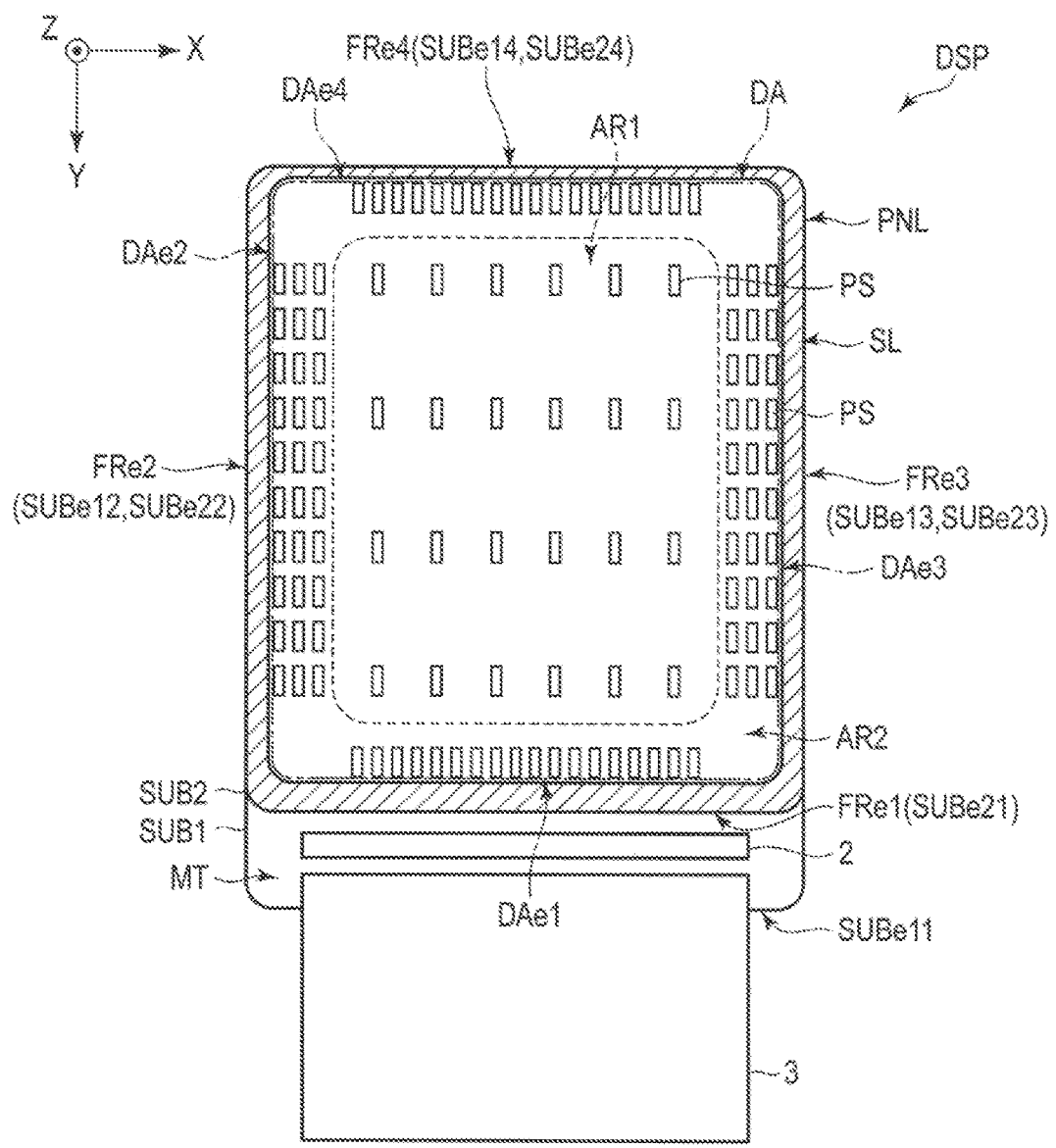
FIG. 4 is a plan view showing a configuration example of the display panel according to the first embodiment.

FIG. 4 is a plan view showing a configuration example of the display panel PNL according to the first embodiment. FIG. 4 shows an example of the arrangement of a spacer PS in the display panel PNL.

The display panel PNL includes the spacer PS which forms a predetermined cell gap between the first substrate SUB1 and the second substrate SUB2. In a plan view of the display panel PNL, the proportion of the spacers PS to the area located on the outside of the area located at the center of the display area DA per unit area is larger than the proportion of the spacers PS to the area located at the center of the display area DA per unit area. That is, as compared to an area located at the center of the display area DA, the display panel PNL includes the spacers PS at a high density in the area located on the outside of this area.

In the example illustrated, the spacer PS extends in the second direction Y, and a width thereof in the second direction Y is greater than a width thereof in the first direction X. In the display panel PNL, as compared to a first area AR1 located at the center of the display area DA, the spacers PS are arranged at a high density in a second area AR2 located on the outside of the first area AR1. For example, the second area AR2 is located between the first area AR1 and the four edges DAe1 to DAe4.

FIG. 5 is a plan view showing a configuration example of the spacer PS according to the first embodiment. FIG. 5 is an enlarged view of the spacer PS shown in FIG. 4. FIG. 5 only shows a configuration necessary for explanation.

The spacer PS includes a projection CP and a recess RP which is paired with the projection CP. In a plan view, the projection CP is located within the recess RP. In the example illustrated, the projection CP has four edges CPe11, CPe12, CPe13 and CPe14. Further, the recess RP has four inner walls IW11, IW12, IW13 and IW14. Two edges CPe12 and CPe13 of the projection CR arranged in the first direction X are located at a distance WS1 from two inner walls IW12 and IW13 of the recess RP arranged in the first direction X, respectively. Further, two edges CPe11 and CPe14 of the projection CR arranged in the second direction Y are located at a distance WL1 from two inner walls IW11 and IW14 of the recess RP arranged in the second direction Y, respectively. For example, the distance WS1 is 5 μm. The distance WS1 is greater than the distance WL1. Further, for example, the distance WS1 may be less than the distance WL1. The distance between the edge CPe12 and the inner wall IW12 may be different from the distance between the edge CPe13 and the inner wall IW13 in the first direction X. Further, the distance between the edge CPe11 and the inner wall IW11 may be different from the distance between the edge CPe14 and the inner wall IW14 in the second direction Y.

In a plan view, the spacer PS overlaps the intersection of the signal line S and the scanning line G and extends in the second direction Y. In the example illustrated, the spacer PS is bent along the signal line S and extends in the second direction Y. In a plan view, the projection CP and the recess RP are bent along the signal line S and extend in the second direction Y. The spacer PS may have another shape and may have, for example, a circular shape and a quadrangular shape in a plan view. Further, the projection CP and the recess RP may have different shapes from each other.

FIG. 6 is a sectional view showing a configuration example of the spacer PS constituting the display device DSP taken along line VI-VI shown in FIG. 5.

A semiconductor layer SC is located between the first insulating film 11 and the second insulating film 12. In the example illustrated, the semiconductor layers SC (SCn and SCn+1) are spaced apart from each other in the first direction X above the first insulating film 11.

A drain electrode DR is located between the third insulating film 13 and the fourth insulating film 14. In the example illustrated, the drain electrodes DR (DRn and DRn+1) are spaced apart from each other in the first direction X above the third insulating film 13. A contact hole CH penetrates the fourth insulating film 14 and the fifth insulating film 15 down to the drain electrode DR. In the example illustrated, a contact hole CHn penetrates the fourth insulating film 14 and the fifth insulating film 15 down to a drain electrode DRn. A contact hole CHn+1 penetrates the fourth insulating film 14 and the fifth insulating film 15 down to a drain electrode DRn+1. The pixel electrode PE is electrically connected to the drain electrode DR via the contact hole CH. In the example illustrated, a pixel electrode PEn is electrically connected to the drain electrode DRn via the contact hole CHn. The pixel electrode PEn+1 is electrically connected to the drain electrode DRn+1 via the contact hole CHn+1. Although not shown in the drawing, the drain electrode DR is electrically connected to the semiconductor layer SC via a contact hole which penetrates the second insulating film 12 and the third insulating film 13. Therefore, the drain electrode DRn is electrically connected to the semiconductor layer SCn. The drain electrode DRn+1 is electrically connected to the semiconductor layer SCn+1.

The spacer PS supports the first substrate SUB1 and the second substrate SUB2 between the first substrate SUB1 and the second substrate SUB2. The projection CP projects in the third direction Z, and the recess RP is recessed in the third direction Z. The projection CP is opposed to the paired recess RP. In the example illustrated, the projection CP is located in the second substrate SUB2, and the recess RP is located in the first substrate SUB1. The projection CP is fixed below the overcoat layer OC. The projection CP is tapered toward a tip portion TP in the third direction Z. The tapered portion of the projection CP is covered with the second alignment film AL2. The tip portion TP of the projection CP engages with the recess RP. The tip portion TP of the projection CP may contact a bottom portion BT of the recess RP. The recess RP is formed, for example, by removing the first alignment film AL1, the fourth insulating film 14 and the fifth insulating film 15. Therefore, the bottom portion BT of the recess RP is located, for example, in the fourth insulating film 14. A depth h of the recess RP in the third direction Z is such a depth that the projection CP will not come out of the recess RP by the displacement between the first substrate SUB1 and the second substrate SUB2, etc. The depth h should preferably be greater than or equal to 1.5 µm. The depth h may be less than 1.5 µm. If the spacer PS is configured as described above, an alignment film is not provided in the bottom portion BT of the recess RP, and therefore an alignment film, for example, the first alignment film AL1 will not be damaged by displacement of the tip portion TP of the projection CP, etc. Further, the spacer PS can prevent displacement, etc., since the projection CP is engaged with the recess RP.

Figure 7:
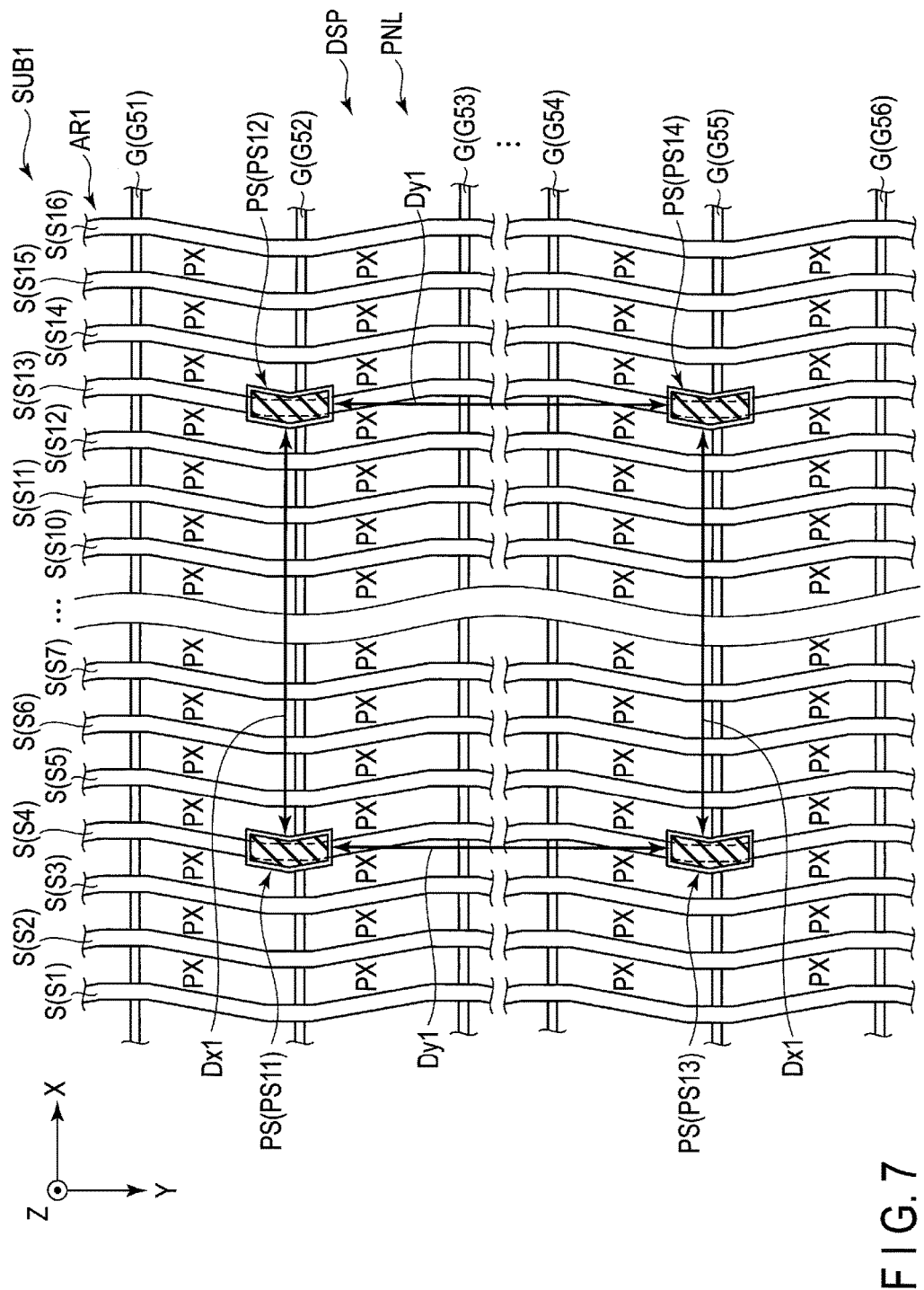
FIG. 7 is a plan view showing a configuration example of a first area of the display panel according to the first embodiment.

FIG. 7 is a plan view showing a configuration example of the first area AR1 of the display panel PNL according to the first embodiment. FIG. 7 shows an example of the arrangement of the spacer PS shown in FIGS. 5 and 6 in the first area AR1 of the display panel PNL. FIG. 7 shows a part of the first area AR1 of the display panel PNL and only shows a configuration necessary for explanation.

In the first area AR1, the spacers PS are located at a distance Dx1 from each other in the first direction X and are located at a distance Dy1 from each other in the second direction Y. For example, if the spacers PS are arranged at a density M in the first area AR1, the spacer PS should preferably be arranged at a density higher than the density M and less than or equal to twice the density M in the second area AR2.

In the example illustrated, a spacer PS11 overlaps the intersection of a signal line S4 and a scanning line G52. A spacer PS12 overlaps the intersection of a signal line S13 and the scanning line G52. A spacer PS13 overlaps the intersection of the signal line S4 and a scanning line G55. A spacer PS14 overlaps the intersection of the signal line S13 and the scanning line G55.

The spacer PS11 and the spacer PS12 are located at the distance Dx1 from each other in the first direction X. The spacer PS13 and the spacer PS14 are located at the distance Dx1 from each other in the first direction X. The spacer PS11 and the spacer PS13 are located at the distance Dy1 from each other in the second direction Y. The spacer PS12 and the spacer PS14 are located at the distance Dy1 from each other in the second direction Y.

In the first area AR1, the spacers PS may be located at different distances in the first direction X and may be located at different distances in the second direction Y. For example, the distance between the spacer PS11 and the spacer PS12 in the first direction X may be different from the distance between the spacer PS13 and the spacer PS14 in the first direction X. The distance between the spacer PS11 and the spacer PS13 in the second direction Y may be different from the distance between the spacer PS12 and the spacer PS14 in the second direction Y.

Figure 8:
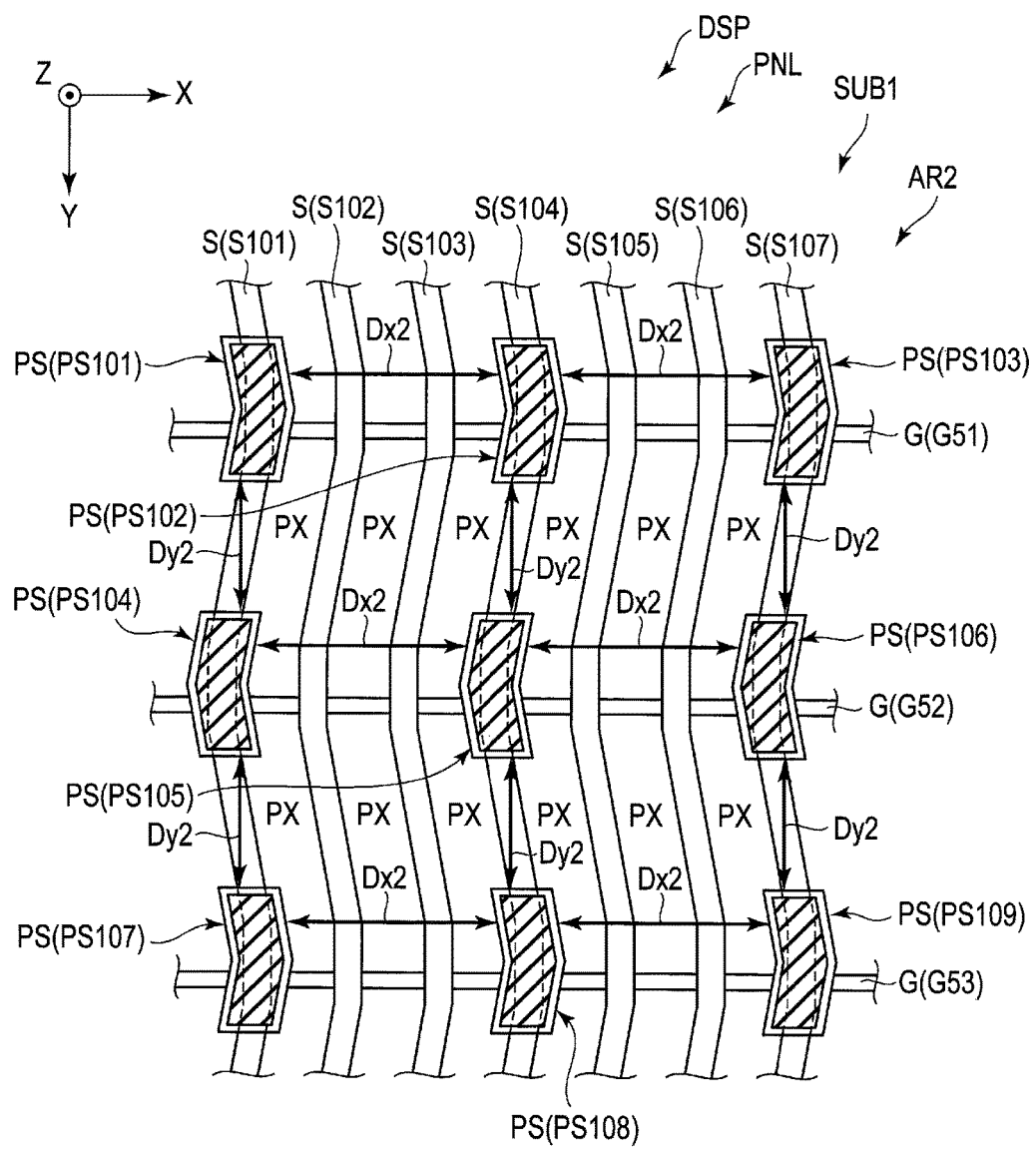
FIG. 8 is a plan view showing a configuration example of a second area of the display panel according to the first embodiment.

FIG. 8 is a plan view showing a configuration example of the second area AR2 of the display panel PNL according to the first embodiment. FIG. 8 shows an example of the arrangement of the spacer PS shown in FIGS. 5 and 6 in the second area AR2 of the display panel PNL. FIG. 8 shows a part of the second area AR2 of the display panel PNL and only shows a configuration necessary for explanation.

In the second area AR2, the spacers PS are located at a distance Dx2 from each other in the first direction X and are located at a distance Dy2 from each other in the second direction Y. The distance Dx2 is less than the distance Dx1, and the distance Dy2 is less than the distance Dy1. For example, the distance Dx2 corresponds to about the widths of three subpixels in the first direction X but is not limited to the example illustrated. Further, the distance Dy2 corresponds to about the width of one subpixel in the second direction Y but is not limited to the example illustrated. Therefore, the density of the spacers PS arranged in the second area AR2 is higher than the density of the spacers PS arranged in the first area AR1.

In the example illustrated, a spacer PS101 overlaps the intersection of a signal line S101 and a scanning line G51. A spacer PS102 overlaps the intersection of a signal line S104 and the scanning line G51. A spacer PS103 overlaps the intersection of a signal line S107 and the scanning line G51. A spacer PS104 overlaps the intersection of the signal line S101 and the scanning line G52. A spacer PS105 overlaps the intersection of the signal line S104 and the scanning line G52. A spacer PS106 overlaps the intersection of the signal line S107 and the scanning line G52. A spacer PS107 overlaps the intersection of the signal line S101 and a scanning line G53. A spacer PS108 overlaps the intersection of the signal line S104 and the scanning line G53. A spacer PS109 overlaps the intersection of the signal line S107 and the scanning line G53.

The spacers PS101, PS102 and PS103 are arranged along the scanning line G51 and are located at the distance Dx2 from each other in the first direction X. The spacers PS104, PS105 and PS106 are arranged along the scanning line G52 and are located at the distance Dx2 from each other in the first direction X. The spacers PS107, PS108 and PS109 are arranged along the scanning line G53 and are located at the distance Dx2 from each other in the first direction X. Further, the spacers PS101, PS104 and PS107 are arranged along the signal line S101 and are located at the distance Dy2 from each other in the second direction Y. The spacers PS102, PS105 and PS108 are arranged along the signal line S104 and are located at the distance Dy2 from each other in the second direction Y. The spacers PS103, PS106 and PS109 are arranged along the signal line S107 and are located at the distance Dy2 from each other in the second direction Y.

In the second area AR2, the spacers PS may be located at different distances from each other in the first direction X as long as the distances are less than the distances in the first direction X in the first area AR1. For example, the distance between the spacer PS101 and the spacer PS102 in the first direction X may be different from the distance between the spacer PS102 and the spacer PS103 in the first direction X. Further, in the second area AR2, the spacers PS may be located at different distances from each other in the second direction Y as long as the distances are less than the distances in the second direction Y in the first area AR1. For example, the distance between the spacer PS101 and the spacer PS104 in the second direction Y may be different from the distance between the spacer PS104 and the spacer PS107 in the second direction Y.

FIG. 9 is a plan view showing a configuration example of the light-shielding layer BM and the color filter CF according to the first embodiment. FIG. 9 shows an example of the arrangement of the light-shielding layer BM and the color filter CF in the first area AR1 shown in FIG. 7 and the second area AR2 shown in FIG. 8. FIG. 9 shows a part of the configuration example of the first area AR1 on the left side and a part of the configuration example of the second area AR2 on the right side.

In a plan view, the light-shielding layer BM overlaps the signal line S and the scanning line G. In the example illustrated, the light-shielding layer BM is formed in the shape of a grid along the signal lines S and the scanning lines G. The light-shielding layer BM includes a lateral light-shielding layer BMX extending in the first direction X along the scanning line G and a longitudinal light-shielding layer BMY extending in the second direction Y along the signal line S. The light-shielding layer BM may be formed into a shape other than the shape of a grid such as the shape of a ladder or stripes. Further, in the example illustrated, the width of the spacer PS in the second direction Y is greater than a width BMy of the surrounding lateral light-shielding layer BMX in the second direction Y. Therefore, to prevent leakage of light resulting from poor alignment of liquid crystal molecules, etc., the light-shielding layer BM includes an extension EP overlapping the spacer PS. The extension EP extends toward the openings OP. In the example illustrated, the extension EP extends toward the opening OP in a circular shape at the intersection of the signal line S and the scanning line G. Therefore, the width of the extension EP in the second direction Y is greater than the width BMy of the surrounding lateral light-shielding layer BMX in the second direction Y.

In the example illustrated, an extension EP11 overlaps the spacer PS11 in the first area AR1. Further, extensions EP101, EP102, EP103, EP104, EP105, EP106, EP107, EP108 and EP109 overlap spacers PS101, PS102, PS103, PS104, PS105, PS106, PS107, PS108 and PS109, respectively, in the second area AR2.

The opening OP is an area which contributes to display. In the example illustrated, the openings OP are partitioned with the light-shielding layer BM and are arranged in a matrix in the X-Y plane. The color filter CF is located in the opening OP. The color filter CF includes a color filter CF1 of the first color, a color filter CF2 of the second color and a color filter CF3 of the third color. The first color, the second color and the third color are different colors. For example, the color filter CF1 is a red color filter, the color filter CF2 is a green color filter, and the color filter CF3 is a blue color filter. The color filter CF1, the color filter CF2 and the color filter CF3 are arranged in this order in cycles in the first direction X. Further, the color filter CF1, the color filter CF2 and the color filter CF3 are spaced apart from each other in the second direction Y.

In the example illustrated, in the first area AR1, the color filters CF1 to CF3 are arranged in this order in cycles in the first direction X between the signal line S1 and the signal line S7. Also in the second area AR2, similarly to the first area AR1, the color filters CF1 to CF3 are arranged in this order in cycles in the first direction X between the signal line S101 and the signal line S107. Further, each of the extension EP11 and EP101 to EP109 is located between the color filter CF1 and the color filter CF3.

Figure 10:
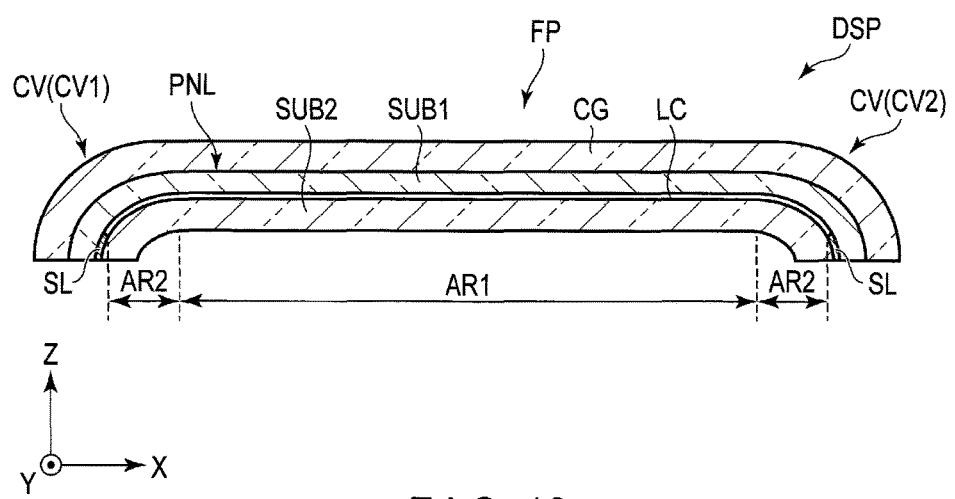
FIG. 10 is a sectional view showing a configuration example of the display device of the first embodiment.

FIG. 10 is a sectional view showing a configuration example of the display device DSP of the first embodiment.

In the example illustrated, the display device DSP includes two curved portions CV (CV1 and CV2) which are curved at both ends thereof in the first direction X, and a flat portion FP which is substantially flat between the two curved portions CV. The flat portion FP has the first area AR1, the curved portions CV have the second area AR2. The display device DSP may have such a structure that an area thereof between the two curved portions CV in the first direction X is curved. Alternatively, the display device DSP may not have a curved structure in the first direction X. The display device DSP may include two curved portions which are curved at both ends thereof in the second direction Y.

For example, the first substrate SUB1 and the second substrate SUB2 may be displaced from each other in a case where the display panel PNL is attached to the cover member CG in the process of manufacturing the display device DSP or under normal use, etc. For example, if the color member CG is attached to the display panel PNL, a stress may act in the first substrate SUB1 in such a manner as to stretch the first substrate SUB1 outward in the first direction X, and a stress may act in the second substrate SUB2 in such a manner as to contract the second substrate SUB2 inward in the first direction X. In this case, according to the stress applied to the display panel PNL, displacement (hereinafter referred to as lateral displacement) may occur between the first substrate SUB1 and the second substrate SUB2 in the first direction X. Regarding the intensity of the stress applied to the display panel PNL, the stress acting in the curved portion CV is higher than the stress acting on the flat portion FP. Therefore, the amount of lateral displacement in the curved portion CV is larger than the amount of lateral displacement in the flat portion FP in the display panel PNL.

In the display panel PNL, the spacers PS are arranged at a high density in the first direction X according to the intensity of the stress. For example, in the display panel PNL, the density of the spacers PS in the second area AR2 is higher than the density of the spacers PS in the first area AR1 in the first direction X as shown in FIGS. 7 and 8. As the spacers PS are arranged according to the intensity of the stress, the display panel PNL can efficiently prevent lateral displacement between the first substrate SUB1 and the second substrate SUB2. The spacers PS have such a density distribution that the density is weighted according to the bend angle from the first area AR1 to the second area AR2. For example, if the spacers PS are arranged at the density M in the first area AR1, the spacers PS are arranged such that the density increases as the bend angle increases in the second area AR2. The spacers PS are arranged at a density higher than the density M and less than or equal to twice the density M in the second area AR2.

Also in a case where the display device DSP has curved portions in the second direction Y, similarly to a case where the display device DSP has curved portions in the first direction X, the spacers PS are arranged in the display panel PNL at a high density according to the intensity of the stress applied in the second direction Y. For example, in the display panel PNL, the density of the spacers PS in the second area AR2 is higher than the density of the spacers PS in the first area AR1 in the second direction Y. As the spacers PS are arranged at a high density according to the intensity of the stress applied in the second direction Y, the display panel PNL can efficiently prevent displacement between the first substrate SUB1 and the second substrate SUB2 in the second direction Y.

According to the present embodiment, the display device DSP includes the display panel PNL in which the first substrate SUB1 and the second substrate SUB2 are attached together with the sealant SL. The display panel PNL includes the spacer PS between the first substrate SUB1 and the second substrate SUB2. In the display panel PNL, the density of the spacers PS in the second area AR2 located on the outside of the first area AR1 is higher than the density of the spacers PS in the first area AR1 located at the center. Therefore, the display device DSP can prevent damage of the alignment film caused by friction between the spacer PS and the alignment film resulting from displacement, etc. That is, the display device DSP can prevent leakage of light resulting from poor alignment caused by damage of the alignment film and can prevent reduction of the contrast ratio. Therefore, a display device which is improved in display quality can be provided.

Next, display devices according to modifications and another embodiment will be described. In the modifications and the other embodiment which will be described below, the same portions as those of the first embodiment will be denoted by the same reference numbers and detailed description thereof will be omitted or simplified, and different portions from those of the first embodiment will be mainly described in detail.

Figure 11:
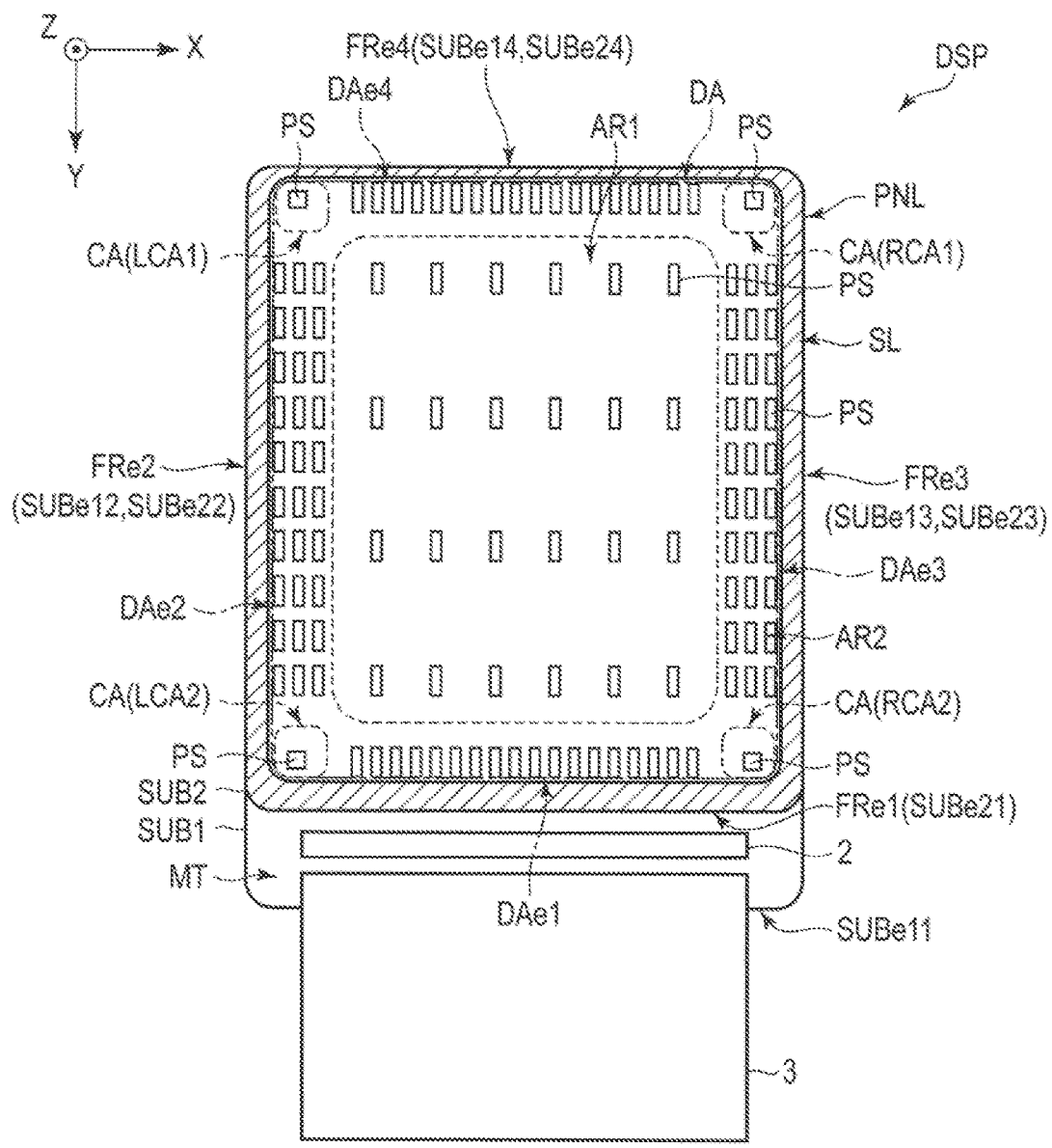
FIG. 11 is a plan view showing a configuration example of a display panel according to modification 1.

FIG. 11 is a plan view showing a configuration example of the display panel PNL according to modification 1. FIG. 11 shows an example of the arrangement of the spacer PS in the display panel PNL.

The display device DSP according to modification 1 differs from the display device DSP shown in FIG. 4 in the arrangement of the spacer PS.

In the example illustrated, the display panel PNL includes the spacers PS in corner areas CA (RCA1, RCA2, LCA1 and LCA2) of the second area AR2. Four corner areas RCA1, RCA2, LCA1 and LCA2 are located at four corners of the second area AR2, respectively. The spacers PS arranged at the corner areas CA have a quadrangular shape.

Figure 12:
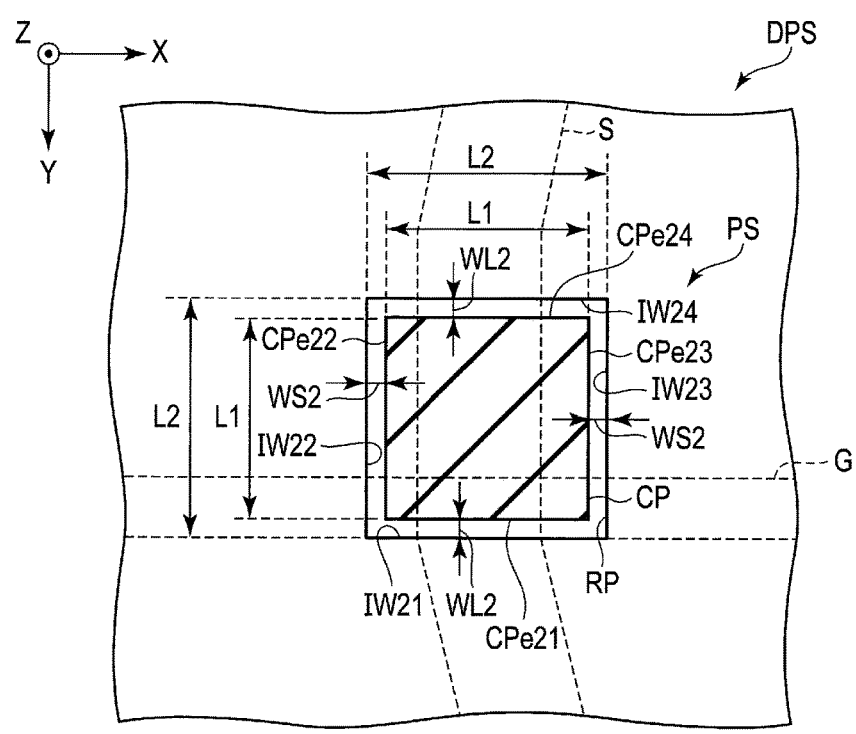
FIG. 12 is a plan view showing a configuration example of a spacer according to modification 1.

FIG. 12 is a plan view showing a configuration example of the spacer PS according to modification 1. FIG. 12 is an enlarged view of the spacer PS arranged in the corner area CA shown in FIG. 11. FIG. 12 only shows a configuration necessary for explanation.

In the example illustrated, the projection CP has four edges CPe21, CPe22, CPe23 and CPe24. Further, the recess RP has four inner walls IW21, IW22, IW23 and IW24. Two edges CPe22 and CPe23 of the projection CR arranged in the first direction X are located at a distance WS2 from two inner walls IW22 and IW23 of the recess RP arranged in the first direction X, respectively. Further, two edges CPe21 and CPe24 of the projection CR arranged in the second direction Y are located at a distance WL2 from two inner walls IW21 and IW24 of the recess RP arranged in the second direction Y, respectively. For example, the distance WS2 is 5 µm. Further, for example, the distance WS2 and the distance WL2 may be similar to each other. The distance between the edge CPe22 and the inner wall IW22 may be different from the distance between the edge CPe23 and the inner wall IW23 in the first direction X. Further, the distance between the edge CPe21 and the inner wall IW21 may be different from the distance between the edge CPe24 and the inner wall IW24 in the second direction Y.

In a plan view, the spacer PS overlaps the intersection of the signal line S and the scanning line G. Further, the projection CP and the recess RP of the spacer PS have the shape of a square. In the example illustrated, the recess RP has the shape of a square whose side has a length L1, and the projection CP has the shape of a square whose side has a length L2. The length L1 is greater than the length L2. Further, a cross-section of the spacer PS shown in FIG. 12 is substantially similar to a cross-section of the spacer PS shown in FIG. 6, and therefore detailed description thereof will be omitted. The length L1 may be greater than or equal to the width of the spacer PS shown in FIG. 5 in the first direction X or may be less than or equal to the width of the spacer PS shown in FIG. 5 in the first direction X. Further, the length L1 may be greater than or equal to the width of the spacer PS shown in FIG. 5 in the second direction Y or may be less than or equal to the width of the spacer PS shown in FIG. 5 in the second direction Y.

FIG. 13 is a plan view showing a configuration example of the corner area CA of the display panel PNL according to modification 1. FIG. 13 shows an example of the arrangement of the spacer PS shown in FIG. 12 in one corner area RCA1 of four corner areas CA of the display panel PNL. FIG. 13 shows a part of the corner area CA of the display panel PNL and only shows a configuration necessary for explanation. Similarly to the corner area RCA1, the arrangement of the spacer PS shown in FIG. 12 can also be applied to the corner areas CA (RCA2, LCA1 and LCA2) other than the corner area RCA1. Therefore, the arrangement of the spacer PS in the corner areas CA other than the corner area RCA1 will not be described.

In the corner area RCA1, the spacers PS are located at a distance Dx3 from each other in the first direction X and are located at a distance Dy3 from each other in the second direction Y. The distance Dx3 is less than the distance Dx1, and the distance Dy3 is less than the distance Dy1. For example, the distance Dx3 corresponds to about the widths of three subpixels in the first direction X but is not limited to the example illustrated. Further, the distance Dy3 corresponds to about the width of one subpixel in the second direction Y but is not limited to the example illustrated. Therefore, the density of the spacers PS arranged in the corner area CA is higher than the density of the spacers PS arranged in the first area AR1.

In the example illustrated, a spacer PS201 overlaps the intersection of the signal line S101 and a scanning line G1. A spacer PS202 overlaps the intersection of the signal line S104 and the scanning line G1. A spacer PS203 overlaps the intersection of the signal line S107 and the scanning line G1. A spacer PS204 overlaps the intersection of the signal line S101 and a scanning line G2. A spacer PS205 overlaps the intersection of the signal line S104 and the scanning line G2. A spacer PS206 overlaps the intersection of the signal line S107 and the scanning line G2. A spacer PS207 overlaps the intersection of the signal line S101 and a scanning line G3. A spacer PS208 overlaps the intersection of the signal line S104 and the scanning line G3. A spacer PS209 overlaps the intersection of the signal line S107 and the scanning line G3.

The spacers PS201, PS202 and PS203 are arranged along the scanning line G1 and are located at the distance Dx3 from each other in the first direction X. The spacers PS204, PS205 and PS206 are arranged along the scanning line G2 and are located at the distance Dx3 from each other in the first direction X. The spacers PS207, PS208 and PS209 are arranged along the scanning line G3 and are located at the distance Dx3 from each other in the first direction X. Further, the spacers PS201, PS204 and PS207 are arranged along the signal line S101 and are located at the distance Dy3 from each other in the second direction Y. The spacers PS202, PS205 and PS208 are arranged along the signal line S104 and are located at the distance Dy3 from each other in the second direction Y. The spacers PS203, PS206 and PS209 are arranged along the signal line S107 and are located at the distance Dy3 from each other in the second direction Y.

In the corner area RCA1, the spacers PS may be located at different distances from each other in the first direction X as long as the distances are less than the distances in the first direction X in the first area AR1. For example, the distance between the spacer PS201 and the spacer PS202 in the first direction X may be different from the distance between the spacer PS202 and the spacer PS203 in the first direction X. Further, in the corner area RCA1, the spacers PS may be located at different distances from each other in the second direction Y as long as the distances are less than the distances in the second direction Y in the first area AR1. For example, the distance between the spacer PS201 and the spacer PS204 in the second direction Y may be different from the distance between the spacer PS204 and the spacer PS207 in the second direction Y.

FIG. 14 is a plan view showing a configuration example of the light-shielding layer BM and the color filter CF according to modification 1. FIG. 14 shows an example of the arrangement of the light-shielding layer BM and the color filter CF in the corner area RCA1 shown in FIG. 13. FIG. 14 only shows a configuration example necessary for explanation.

Further, in the example illustrated, the width of the spacer PS in the second direction Y is less than the width BMy of the surrounding lateral light-shielding layer BMX in the second direction Y. Therefore, the light-shielding layer BM does not include the extension EP shown in FIG. 9 in the corner area RCA1.

In the example illustrated, the light-shielding layer BM overlaps the spacers PS201 to PS209 in the corner area RCA1. In the corner area RCA1, the color filters CF1 to CF3 are arranged in this order in cycles in the first direction X between the signal line S101 to the signal line S107.

According to modification 1, the display device DSP includes the spacer PS in the corner area CA. Therefore, the display device of modification 1 is more tolerable to displacement in an oblique direction between the first substrate SUB1 and the second substrate SUB2, etc., than the display device DSP of the first embodiment.

FIG. 15 is a plan view showing a configuration example of the display panel PNL according to modification 2. FIG. 15 shows an example of the arrangement of the spacer PS in the display panel PNL.

The display device DSP according to modification 2 differs from the display device DSP shown in FIG. 4 in further comprising an area in which the spacers PS are arranged at a density different from those of the first area AR1 and the second area AR2.

In the example illustrated, the display panel PNL includes a third area AR3 between the first area AR1 and the second area AR2, and the spacers PS are arranged in the third area AR3 at a density higher than that of the first area AR1 and lower than that of the second area AR2. For example, the spacer PS shown in FIG. 5 is arranged in the third area AR3.

Figure 16:
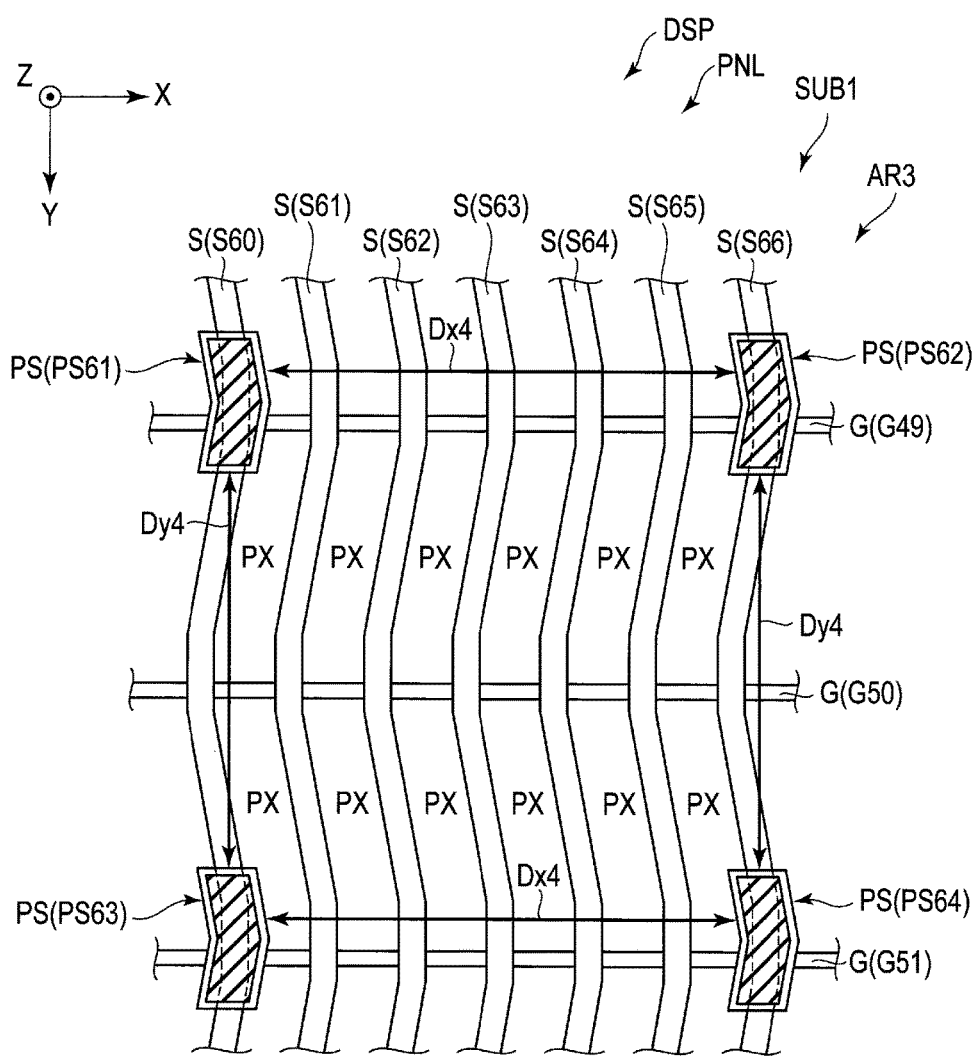
FIG. 16 is a plan view showing a configuration example of a third area of a display panel according to modification 2.

FIG. 16 is a plan view showing a configuration example of the third area AR3 of the display panel PNL according to modification 2. FIG. 16 shows an example of the arrangement of the spacer PS shown in FIG. 5 in the third area AR3 of the display panel PNL. FIG. 16 shows a part of the third area AR3 of the display panel PNL and only shows a configuration necessary for explanation.

In the third area AR3, the spacers PS are located at a distance Dx4 from each other in the first direction X and are located at a distance Dy4 from each other in the second direction Y. The distance Dx4 is less than the distance Dx1 and is greater than the distance Dx2. Further, the distance Dy4 is less than the distance Dy1 and is greater than the distance Dy2. For example, the distance Dx4 corresponds to about the widths of six subpixels in the first direction X but is not limited to the example illustrated. Further, the distance Dy4 corresponds to about the widths of two subpixels in the second direction Y but is not limited to the example illustrated. Therefore, the spacers PS are arranged in the third area AR3 at a density higher than that of the first area AR1 and lower than that of the second area AR2.

In the example illustrated, a spacer PS61 overlaps the intersection of a signal line S60 and a scanning line G49. A spacer PS62 overlaps the intersection of a signal line S66 and the scanning line G49. A spacer PS63 overlaps the intersection of the signal line S60 and the scanning line G51. A spacer PS64 overlaps the intersection of the signal line S66 and the scanning line G51. The spacer PS61 and the spacer PS62 are located at the distance Dx4 from each other in the first direction X. The spacer PS63 and the spacer PS64 are located at the distance Dx4 from each other in the first direction X. The spacer PS61 and the spacer PS63 are located at the distance Dy4 from each other in the second direction Y. The spacer PS62 and the spacer PS64 are located at the distance Dy4 from each other in the second direction Y.

In the third area AR3, the spacers PS may be located at different distances from each other in the first direction X as long as the distances are less than the distances in the first direction X in the first area AR1 and greater than the distances in the first direction X in the second area AR2. For example, the distance between the spacer PS61 and the spacer PS62 in the first direction X may be different from the distance between the spacer PS63 and the spacer PS64 in the first direction X. Further, in the third area AR3, the spacers PS may be located at different distances from each other in the second direction Y as long as the distances are less than the distances in the second direction Y in the first area AR1 and greater than the distances in the second direction Y in the second area AR2. For example, the distance between the spacer PS61 and the spacer PS63 in the second direction Y may be different from the distance between the spacer PS62 and the spacer PS64 in the second direction Y.

According to modification 2, the display device DSP includes the spacer PS in the third area AR3. Therefore, the display device of modification 2 is more tolerable to displacement between the first substrate SUB1 and the second substrate SUB2, etc., than the display device DSP of the first embodiment.

FIG. 17 is a plan view showing a configuration example of the display panel PNL according to the second embodiment. FIG. 17 shows an example of the arrangement of the spacer PS in the display panel PNL.

The display device DSP according to the second embodiment differs from the display device DSP shown in FIG. 4 in the configuration of the spacer PS.

In the example illustrated, the spacer PS extends in the first direction X, and a width thereof in the first direction X is greater than a width thereof in the second direction Y. In the display panel PNL, the density of the spacers PS in the second area AR2 is higher than the density of the spacers PS in the first area AR1.

Figure 18:
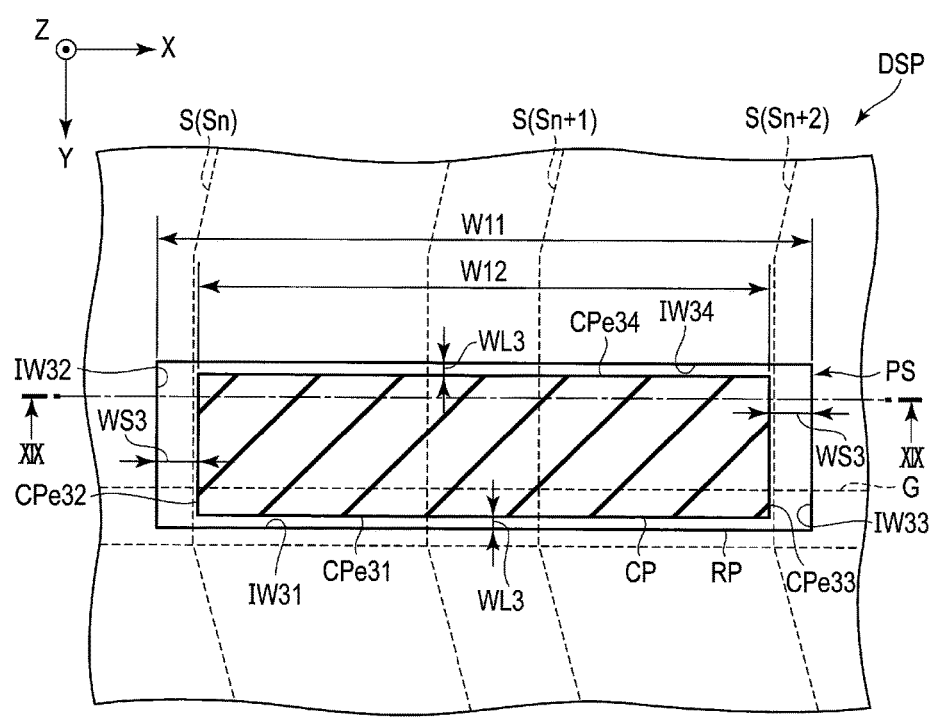
FIG. 18 is a plan view showing a configuration example of a spacer according to the second embodiment.

FIG. 18 is a plan view showing a configuration example of the spacer PS according to the second embodiment. FIG. 18 is an enlarged view of the spacer PS shown in FIG. 17. FIG. 18 only shows a configuration necessary for explanation.

In the example illustrated, the projection CP has four edges CPe31, CPe32, CPe33 and CPe34. Further, the recess RP has four inner walls IW31, IW32, IW33 and IW34. Two edges CPe32 and CPe33 of the projection CR arranged in the first direction X are located at a distance WS3 from two inner walls IW32 and IW33 of the recess RP arranged in the first direction X, respectively. Further, two edges CPe31 and CPe34 of the projection CR arranged in the second direction Y are located at a distance WL3 from two inner walls IW31 and IW34 of the recess RP arranged in the second direction Y, respectively. For example, the distance WS3 is 5 μm. For example, the distance WS3 may be greater than the distance WL3. The distance between the edge CPe32 and the inner wall IW32 may be different from the distance between the edge CPe33 and the inner wall IW33 in the first direction X. Further, the distance between the edge CPe31 and the inner wall IW31 may be different from the distance between the edge CPe34 and the inner wall IW34 in the second direction Y.

In a plan view, the spacer PS overlaps the intersection of the signal line S and the scanning line G and extends in the first direction X. In the example illustrated, the spacer PS has the shape of a rectangle extending in the first direction X. In a plan view, the projection CP and the recess RP extend in the first direction X along the scanning line G. For example, the recess RP has the shape of a rectangle whose long side has a width W11 in the first direction X and whose short side has a width WD1 in the second direction Y. Further, the projection CP has the shape of a rectangle whose long side has a width W12 in the first direction X and whose short side has a width WD2 in the second direction Y. The width W11 in the first direction X is greater than the width W12 in the first direction X, and the width WD1 in the second direction Y is greater than the width WD2 in the second direction Y. For example, the width W11 in the first direction X is a length across three signal lines S (Sn, Sn+1 and Sn+2). The width W11 in the first direction X may be greater or may be less than a length across three signal lines.

Figure 19:
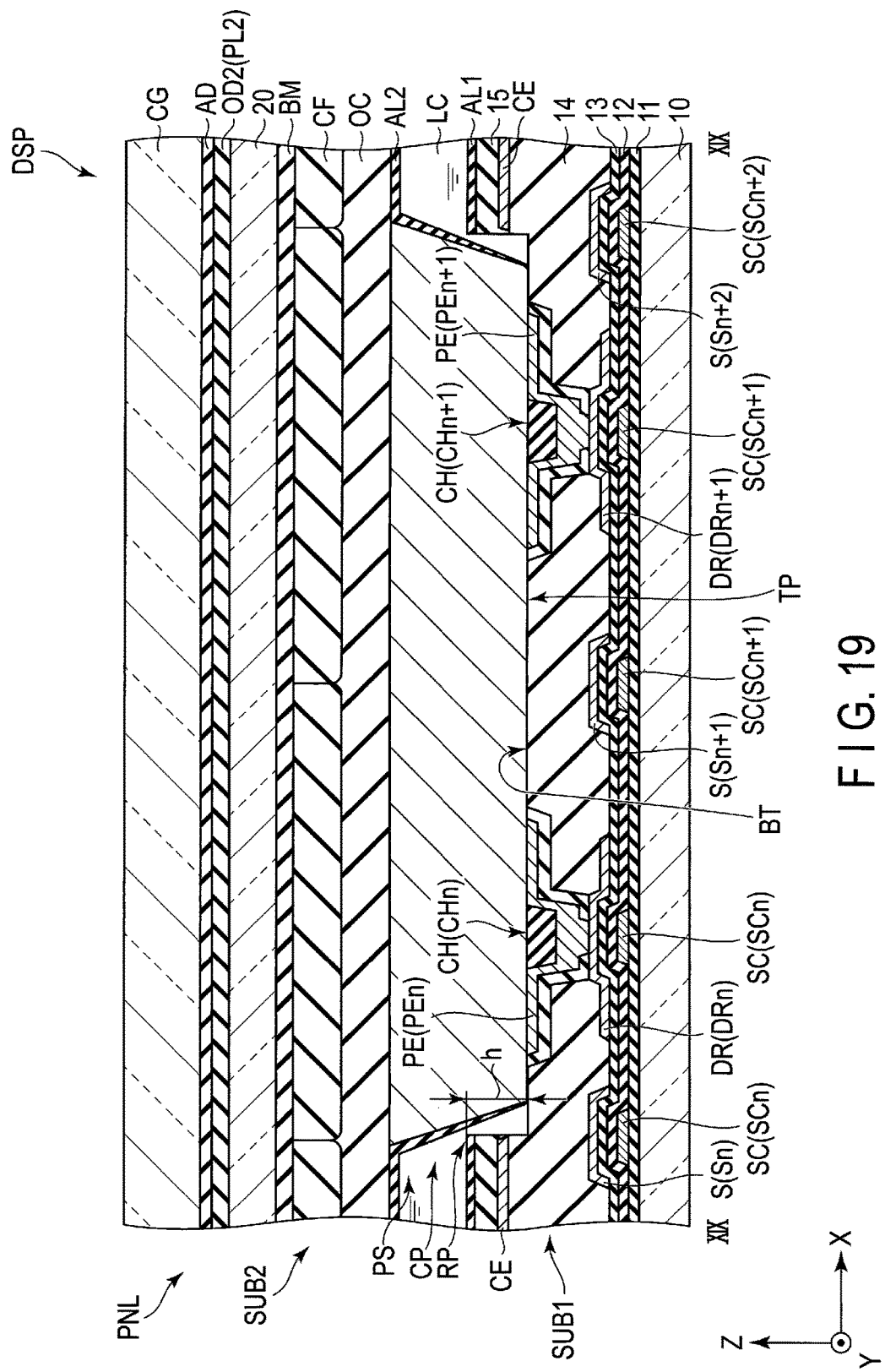
FIG. 19 is a sectional view showing a configuration example of the spacer constituting a display device taken along line XIX-XIX shown in FIG. 18.

FIG. 19 is a sectional view showing a configuration example of the spacer PS constituting the display device DSP taken along line XIX-XIX shown in FIG. 18.

In the example illustrated, the projection CP is located in the second substrate SUB2, and the recess RP is located in the first substrate SUB1. The projection CP extends in the first direction X from the contact hole CHn to the contact hole CHn+1. The tip portion TP of the projection CP engages with the recess RP. A part of the tip portion TP of the projection CP may contact the bottom portion BT. The bottom portion BT of the recess RP is composed of, for example, the fifth insulating film 15 and a part of the pixel electrode PE. The recess RP extends in the first direction X from the contact hole CHn to the contact hole CHn+1.

Figure 20:
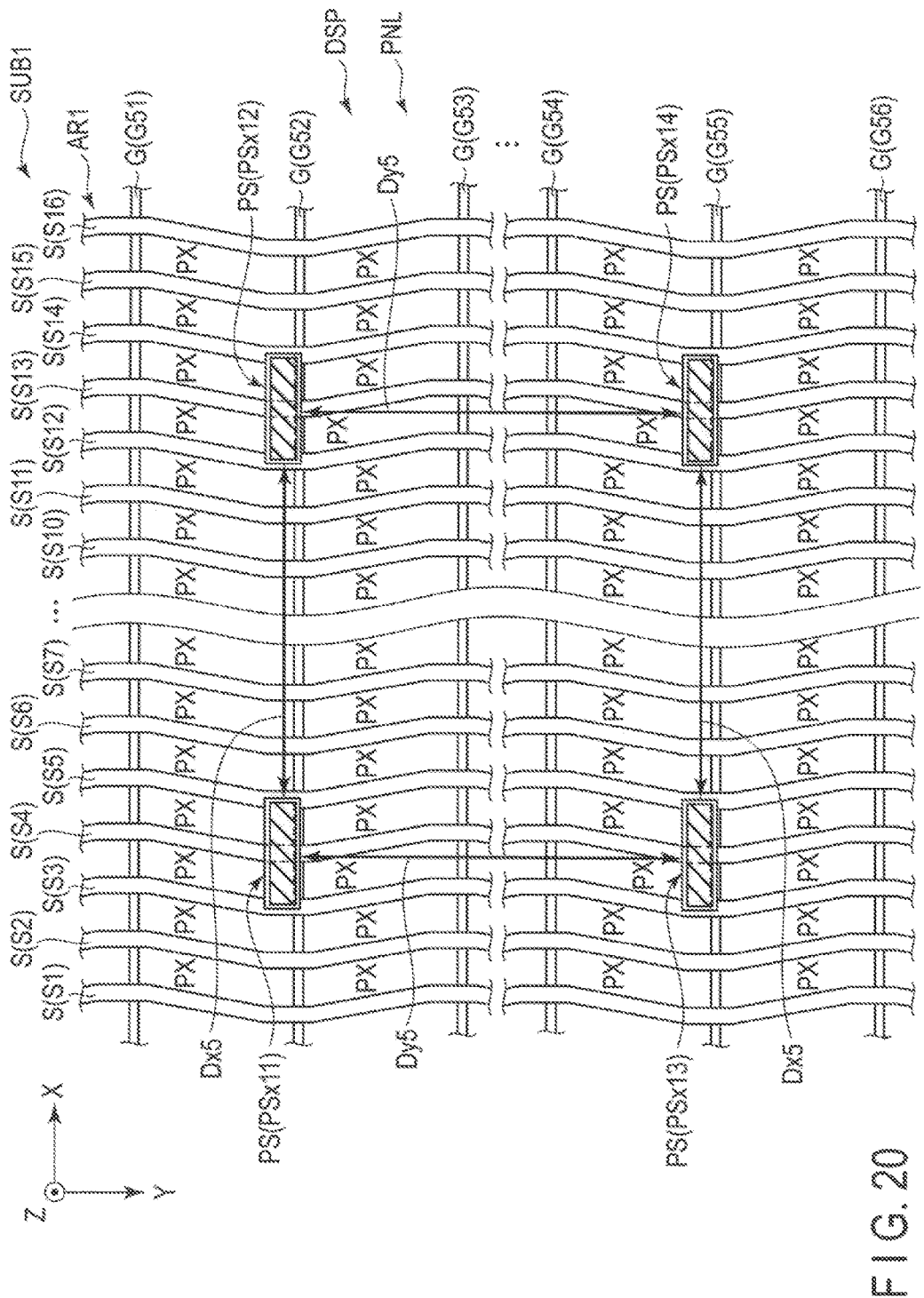
FIG. 20 is a plan view showing a configuration example of a first area of the display panel according to the second embodiment.

FIG. 20 is a plan view showing a configuration example of the first area AR1 of the display panel PNL according to the second embodiment. FIG. 20 shows an example of the arrangement of the spacer PS shown in FIGS. 18 and 19 in the first area AR1 of the display panel PNL. FIG. 20 shows a part of the first area AR1 of the display panel PNL and only shows a configuration necessary for explanation.

In the first area AR1, the spacers PS are located at a distance Dx5 from each other in the first direction X and are located at a distance Dy5 from each other in the second direction Y. The distance Dx5 is substantially similar to the distance Dx1. For example, the distance Dx5 is slightly less than the distance Dx1 and is greater than the distances Dx2 to Dx4. Further, the distance Dy5 is substantially similar to the distance Dy1. For example, the distance Dy5 is slightly less than the distance Dy1 and is greater than the distances Dy2 to Dy4.

In the example illustrated, a spacer PSx11 overlaps the intersection of the signal line S4 and the scanning line G52. A spacer PSx12 overlaps the Intersection of the signal line S13 and the scanning line G52. A spacer PSx13 overlaps the intersection of the signal line S4 and the scanning line G55. A spacer PSx14 overlaps the intersection of the signal line S13 and the scanning line G55.

The spacer PSx11 and the spacer PSx12 are located at the distance Dx5 from each other in the first direction X. The spacer PSx13 and the spacer PSx14 are located at the distance Dx5 from each other in the first direction X. The spacer PSx11 and the spacer PSx13 are located at the distance Dy5 from each other in the second direction Y. The spacer PSx12 and the spacer PSx14 are located at the distance Dy5 from each other in the second direction Y.

In the first area AR1, the spacers PS may be located at different distances from each other in the first direction X and may be located at different distances from each other in the second direction Y. For example, the distance between the spacer PSx11 and the spacer PSx12 in the first direction X may be different from the distance between the spacer PSx13 and the spacer PSx14 in the first direction X. The distance between the spacer PSx11 and the spacer PSx13 in the second direction Y may be different from the distance between the spacer PSx12 and the spacer PSx14 in the second direction Y.

Figure 21:
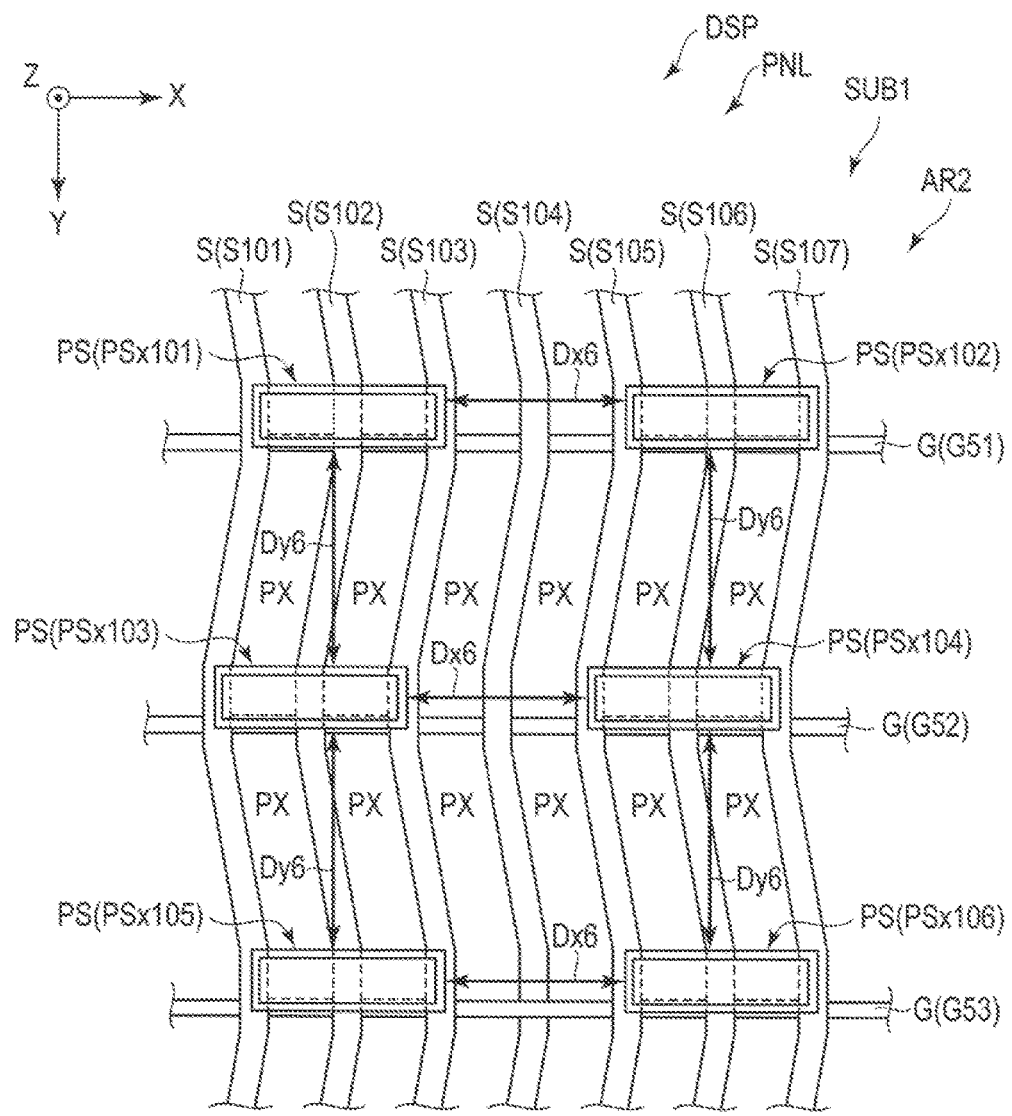
FIG. 21 is a plan view showing a configuration example of a second area of the display panel according to the second embodiment.

FIG. 21 is a plan view showing a configuration example of the second area AR2 of the display panel PNL according to the second embodiment. FIG. 21 shows an example of the arrangement of the spacer PS shown in FIGS. 18 and 19 in the second area AR2 of the display panel PNL. FIG. 21 shows a part of the second area AR2 of the display panel PNL and only shows a configuration necessary for explanation.

In the second area AR2, the spacers PS are located at a distance Dx6 from each other in the first direction X and are located at a distance Dy6 from each other in the second direction Y. The distance Dx6 is less than the distance Dx5, and the distance Dy6 is less than the distance Dy5. For example, the distance Dx6 corresponds to about the widths of two subpixels in the first direction X but is not limited to the example illustrated. Further, the distance Dy6 corresponds to about the width of one subpixel in the second direction Y but is not limited to the example illustrated. Therefore, the density of the spacers PS arranged in the second area AR2 is higher than the density of the spacers PS arranged in the first area AR1.

In the example illustrated, a spacer PSx101 overlaps the intersection of a signal line S102 and the scanning line G51. A spacer PSx102 overlaps the intersection of a signal line S106 and the scanning line G51. A spacer PSx103 overlaps the intersection of the signal line S102 and the scanning line G52. A spacer PSx104 overlaps the intersection of the signal line S106 and the scanning line G52. A spacer PSx105 overlaps the intersection of the signal line S102 and the scanning line G53. A spacer PSx106 overlaps the intersection of the signal line S106 and the scanning line G53.

The spacer PSx101 and the spacer PSx102 are located at the distance Dx6 from each other in the first direction X. The spacer PSx103 and the spacer PSx104 are located at the distance Dx6 from each other in the first direction X. The spacer PSx105 and the spacer PSx106 are located at the distance Dx6 from each other in the first direction X. The spacer PSx101 and the spacer PSx103 are located at the distance Dy6 from each other in the second direction Y. The spacer PSx103 and the spacer PSx105 are located at the distance Dy6 from each other in the second direction Y. The spacer PSx102 and the spacer PSx104 are located at the distance Dy6 from each other in the second direction Y. The spacer PSx104 and the spacer PSx106 are located at the distance Dy6 from each other in the second direction Y.

In the second area AR2, the spacers PS may be located at different distances from each other in the first direction X as long as the distances are less than the distances in the first direction X in the first area AR1. For example, the distance between the spacer PSx101 and the spacer PSx102 in the first direction X may be different from the distance between the spacer PSx103 and the spacer PSx104 in the first direction X. Further, in the second area AR2, the spacers PS may be located at different distances from each other in the second direction Y as long as the distances are less than the distances in the second direction Y in the first area AR1. For example, the distance between the spacer PSx101 and the spacer PSx103 in the second direction Y may be different from the distance between the spacer PSx103 and the spacer PSx104 in the second direction Y.

Figure 22:
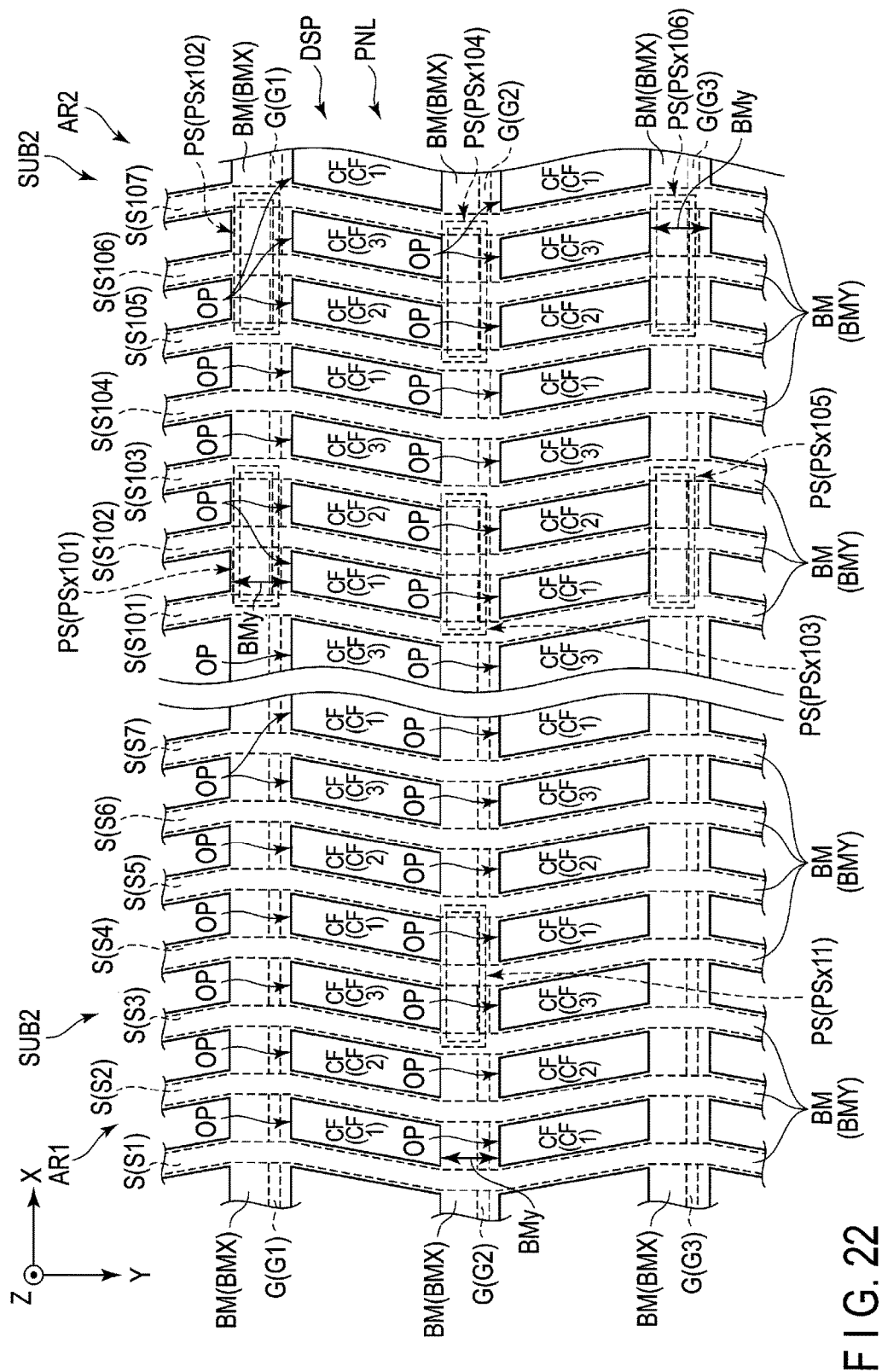
FIG. 22 is a plan view showing a configuration example of a light-shielding layer and a color filter according to the second embodiment.

FIG. 22 is a plan view showing a configuration example of the light-shielding layer BM and the color filter CF according to the second embodiment. FIG. 22 shows an example of the arrangement of the light-shielding layer BM and the color filter CF in the first area AR1 shown in FIG. 20 and the second area AR2 shown in FIG. 21. FIG. 22 shows a part of the configuration example of the first area AR1 on the left side and a part of the configuration example of the second area AR2 on the right side.

Further, in the example illustrated, the width of the spacer PS in the second direction Y is less than the width BMy of the surrounding lateral light-shielding layer BMX in the second direction Y. Therefore, the light-shielding layer BM does not include the extension EP in the first area AR1 and the second area AR2.

In the example illustrated, the light-shielding layer BM overlaps the spacers PSx11 and PSx101 to PSx106 in the first area AR1 and the second area AR2. In the first area AR1, the color filters CF1 to CF3 are arranged in this order in cycles in the first direction X between the signal line S1 and the signal line S7. In the second area AR2, the color filters CF1 to CF3 are arranged in this order in cycles in the first direction X between the signal line S101 and the signal line S107.

According to the second embodiment, advantages similar to those of the previously-described embodiment can be obtained. In addition, since the light-shielding layer BM does not include the extension portion EP, the aperture ratio of the display device DSP improves as compared to that of the display device DSP of the first embodiment.

Figure 23:
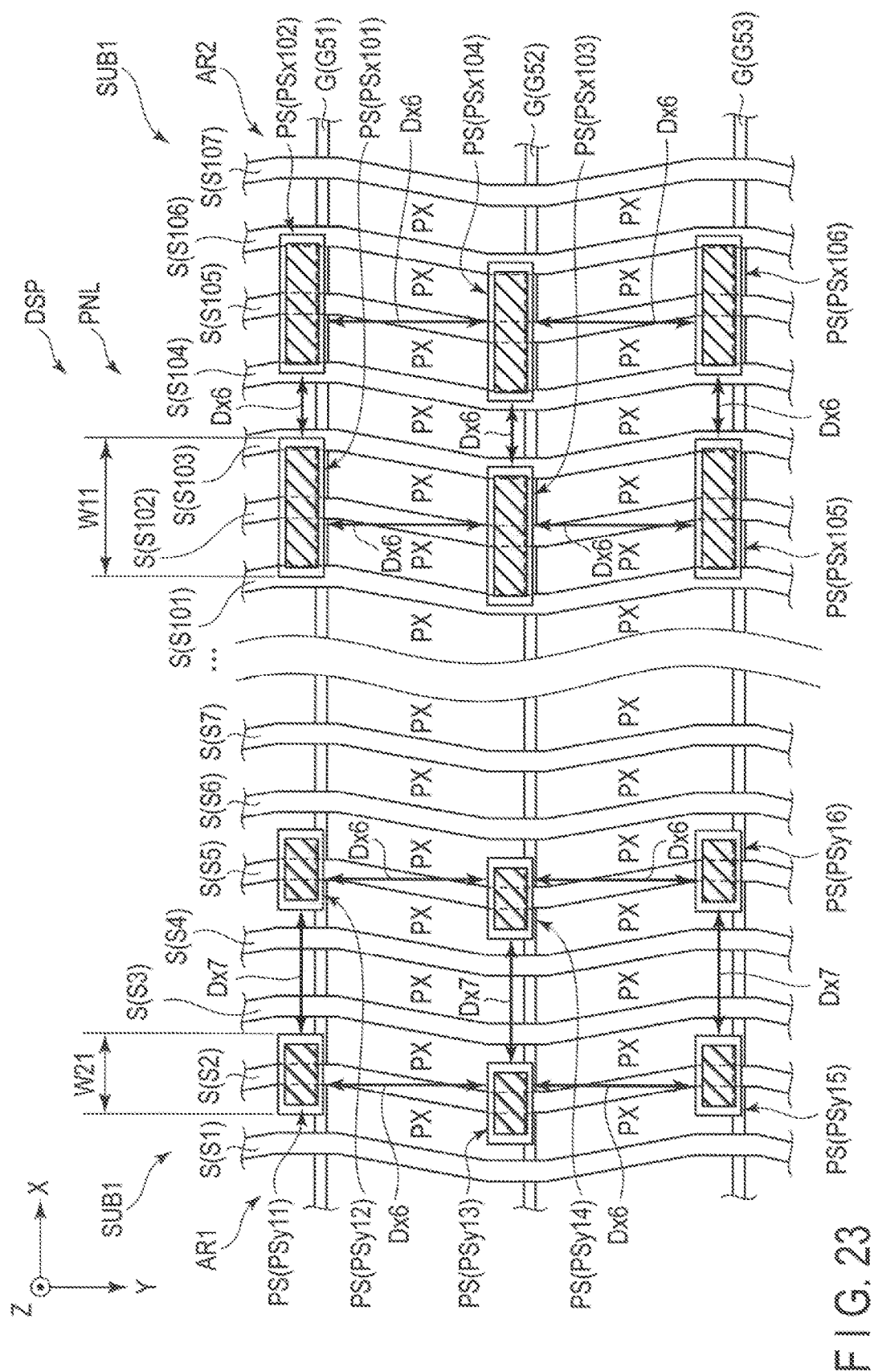
FIG. 23 is a plan view showing a configuration example of a first area and a second area of a display panel according to modification 3.

FIG. 23 is a plan view showing a configuration example of the first area AR1 and the second area AR2 of the display panel PNL according to modification 3. FIG. 23 shows an example of the arrangement of the spacer PS in the first area AR1 and an example of the arrangement of the spacer PS in the second area AR2 of the display panel PNL. FIG. 23 shows a part of the configuration example of the first area AR1 on the left side and a part of the configuration example of the second area AR2 on the right side. The arrangement of the spacer PS of the second area AR2 shown in FIG. 23 is similar to the arrangement of the spacer PS of the second area AR2 shown in FIG. 21, and therefore detailed description thereof will be omitted.

The display device DSP according to modification 3 differs from the display device DSP shown in FIGS. 20 and 21 in that the width in the first direction X of the spacer PS arranged in the first area AR1 differs from the width in the first direction X of the spacer PS arranged in the second area AR2.

In the first area AR1 and the second area AR2, the spacer PS has the shape of a rectangle in which a width thereof in the first direction X is greater than a width thereof in the second direction Y. The width in the first direction X of the spacer PS arranged in the first area AR1 is less than the width in the first direction X of the spacer PS arranged in the second area AR2. In the example illustrated, in the first area AR1 and the second area AR2, the centers of the spacers PS in the first direction X are located at the same distance as each other in the first direction X. Further, in the first area AR1 and the second area AR2, the centers of the spacers PS in the second direction Y are located at the same distance as each other in the second direction Y. A width W21 in the first direction X of the spacer PS arranged in the first area AR1 is less than the width W11 in the first direction X of the spacer PS arranged in the second area AR2. Therefore, even if the spacers PS are arranged in similar manners between the first area AR1 and the second area AR2, the distance between two spacers PS which are adjacent to each other in the first direction X in the first area AR1 is greater than the distance between two spacers PS which are adjacent to each other in the first direction X in the second area AR2. As long as the density of the spacers PS differs between the first area AR1 and the second area AR2, the spacers PS may be arranged in different manners between the first area AR1 and the second area AR2.

In the example illustrated, a spacer PSy11 overlaps the intersection of a signal line S2 and the scanning line G51. A spacer PSy12 overlaps the intersection of a signal line S5 and the scanning line G51. A spacer PSy13 overlaps the intersection of the signal line S2 and the scanning line G52. A spacer PSy14 overlaps the intersection of the signal line S5 and the scanning line G52. A spacer PSy15 overlaps the intersection of the signal line S2 and the scanning line G53. A spacer PSy16 overlaps the intersection of the signal line S5 and the scanning line G53.

The spacer PSy11 and the spacer PSy12 are located at a distance Dx7 from each other in the first direction X. The spacer PSy13 and the spacer PSy14 are located at the distance Dx7 from each other in the first direction X. The spacer PSy15 and the spacer PSy16 are located at the distance Dx7 from each other in the first direction X. The distance Dx7 is greater than the distance Dx6. Further, the spacer PSy11 and the spacer PSy13 are located at the distance Dy6 from each other in the second direction Y. The spacer PSy13 and the spacer PSy15 are located at the distance Dy6 from each other in the second direction Y. The spacer PSy12 and the spacer PSy14 are located at the distance Dy6 from each other in the second direction Y. The spacer PSy14 and the spacer PSy16 are located at the distance Dy6 from each other in the second direction Y.

According to modification 3, the width in the first direction X of the spacer PS arranged in the first area AR1 is less than the width in the first direction X of the spacer PS arranged in the second area AR2. For this reason, even if the spacers PS are arranged in similar manners between the first area AR1 and the second area AR2, the distance between two spacers PS which are adjacent to each other in the first direction X in the first area AR1 is greater than the distance between two spacers PS which are adjacent to each other in the first direction X in the second area AR2. Therefore, the density of the spacers PS arranged in the second area AR2 is higher than the density of the spacers PS arranged in the first area AR1. Consequently, the display device DSP according to modification 3 has advantages similar to those of the previously-described embodiment.

In modification 3, the width in the first direction X of the spacer PS arranged in the first area AR1 is different from the width in the first direction X of the spacer PS arranged in the second area AR2. Instead, the width in the second direction Y of the spacer PS arranged in the first area AR1 may be different from the width in the second direction Y of the spacer PS arranged in the second area AR2. In this case, for example, the spacer PS has the shape of a rectangle in which a width thereof in the second direction Y is greater than a width thereof in the first direction X in the first area AR1 and the second area AR2.

Figure 24:
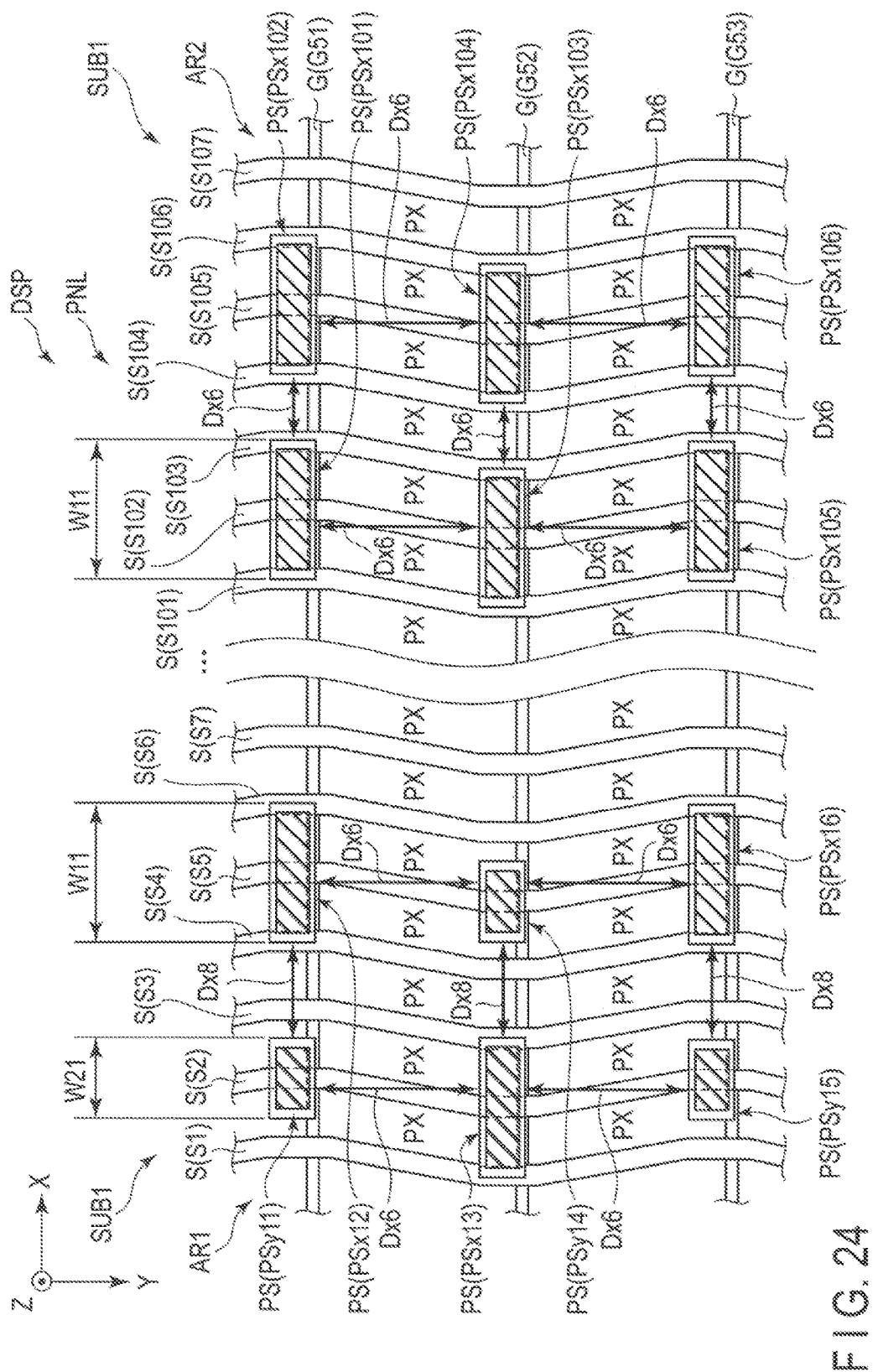
FIG. 24 is a plan view showing a configuration example of a first area and a second area of a display panel according to modification 4.

FIG. 24 is a plan view showing a configuration example of the first area AR1 and the second area AR2 of the display panel PNL according to modification 4. FIG. 24 shows an example of the arrangement of the spacer PS in the first area AR1 and an example of the arrangement of the spacer PS in the second area AR2 of the display panel PNL. FIG. 24 shows a part of the configuration example of the first area AR1 on the left side and a part of the configuration example of the second area AR2 on the right side. The arrangement of the spacer PS of the second area AR2 shown in FIG. 24 is similar to the arrangement of the spacer PS of the second area AR2 shown in FIG. 23, and therefore detailed description thereof will be omitted.

The display device DSP according to modification 4 differs from the display device DSP shown in FIG. 23 in that the spacers having different widths in the first direction X are arranged in the first area AR1.

In the example illustrated, the spacer PS having the width W11 and the spacer PS having the width W21 are alternately arranged in the first direction X along the scanning line G in the first area AR1. Therefore, even if the spacers PS are arranged in similar manners between the first area AR1 and the second area AR2, the distance between two spacers PS which are adjacent to each other in the first direction X in the first area AR1 is greater than the distance between two spacers PS which are adjacent to each other in the first direction X in the second area AR2. As long as the density of the spacers PS differs between the first area AR1 and the second area AR2, the spacers PS may be arranged in different manners between the first area AR1 and the second area AR2.

In the example illustrated, in the first area AR1, the spacer PSy11 overlaps the intersection of the signal line S2 and the scanning line G51. The spacer PSx12 overlaps the intersection of the signal line S5 and the scanning line G51. The spacer PSx13 overlaps the intersection of the signal line S2 and the scanning line G52. The spacer PSy14 overlaps the intersection of the signal line S5 and the scanning line G52. The spacer PSy15 overlaps the intersection of the signal line S2 and the scanning line G53. A spacer PSx16 overlaps the intersection of the signal line S5 and the scanning line G53.

The spacer PSy11 and the spacer PSx12 are located at a distance Dx8 from each other in the first direction X. The spacer PSx13 and the spacer PSy14 are located at the distance Dx8 from each other in the first direction X. The spacer PSy15 and the spacer PSx16 are located at the distance Dx8 from each other in the first direction X. The distance Dx8 is greater than the distance Dx6. Further, the spacer PSy11 and the spacer PSx13 are located at the distance Dy6 from each other in the second direction Y. The spacer PSx13 and the spacer PSy15 are located at the distance Dy6 from each other in the second direction Y. The spacer PSx12 and the spacer PSy14 are located at the distance Dy6 from each other in the second direction Y. Further, the spacer PSy14 and the spacer PSx16 are located at the distance Dy6 from each other in the second direction Y.

According to modification 4, advantages similar to those of the previously-described embodiment can be obtained.

Figure 25:
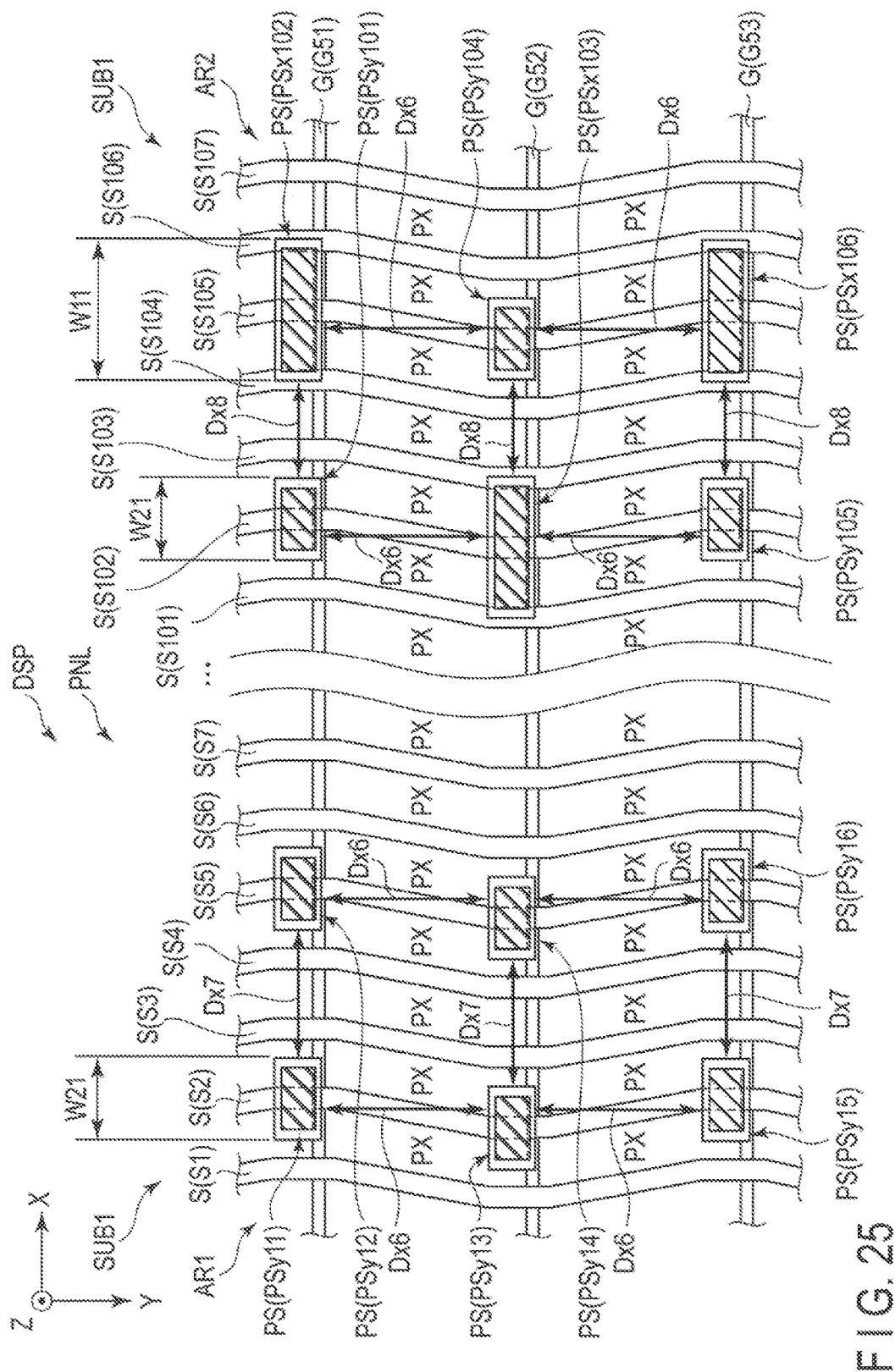
FIG. 25 is a plan view showing a configuration example of a first area and a second area of a display panel according to modification 5.

FIG. 25 is a plan view showing a configuration example of the first area AR1 and the second area AR2 of the display panel PNL according to modification 5. FIG. 25 shows an example of the arrangement of the spacer PS in the first area AR1 and an example of the arrangement of the spacer PS in the second area AR2 of the display panel PNL. FIG. 25 shows a part of the configuration example of the first area AR1 on the left side and a part of the configuration example of the second area AR2 on the right side. The arrangement of the spacer PS of the first area AR1 shown in FIG. 25 is similar to the arrangement of the spacer PS of the first area AR1 shown in FIG. 23, and therefore detailed description thereof will be omitted.

The display device DSP according to modification 5 differs from the display device DSP shown in FIG. 23 in that the spacers having different widths in the first direction X are arranged in the second area AR2.

In the example illustrated, the spacer PS having the width W11 and the spacer PS having the width W21 are alternately arranged in the first direction X along the scanning line G in the second area AR2. Therefore, even if the spacers PS are arranged in similar manners between the first area AR1 and the second area AR2, the distance between two spacers PS which are adjacent to each other in the first direction X in the second area AR2 is less than the distance between two spacers PS which are adjacent to each other in the first direction X in the first area AR1. As long as the density of the spacers PS differs between the first area AR1 and the second area AR2, the spacers PS may be arranged in different manners between the first area AR1 and the second area AR2.

In the example illustrated, in the second area AR2, a spacer PSy101 overlaps the intersection of the signal line S102 and the scanning line G51. The spacer PSx102 overlaps the intersection of a signal line S105 and the scanning line G51. The spacer PSx103 overlaps the intersection of the signal line S102 and the scanning line G52. A spacer PSy104 overlaps the intersection of the signal line S105 and the scanning line G52. A spacer PSy105 overlaps the intersection of the signal line S102 and the scanning line G53. The spacer PSx106 overlaps the intersection of the signal line S105 and the scanning line G53.

The spacer PSy101 and the spacer PSx102 are located at the distance Dx8 from each other in the first direction X. The spacer PSx103 and the spacer PSy104 are located at the distance Dx8 from each other in the first direction X. The spacer PSy105 and the spacer PSx106 are located at the distance Dx8 from each other in the first direction X. The distance Dx8 is less than the distance Dx7. Further, the spacer PSy101 and the spacer PSx103 are located at the distance Dy6 from each other in the second direction Y. The spacer PSx103 and the spacer PSy105 are located at the distance Dy6 from each other in the second direction Y. The spacer PSx102 and the spacer PSy104 are located at the distance Dy6 from each other in the second direction Y. The spacer PSy104 and the spacer PSx106 are located at the distance Dy6 from each other in the second direction Y.

According to modification 5, advantages similar to those of the previously-described embodiment can be obtained.

Figure 26:
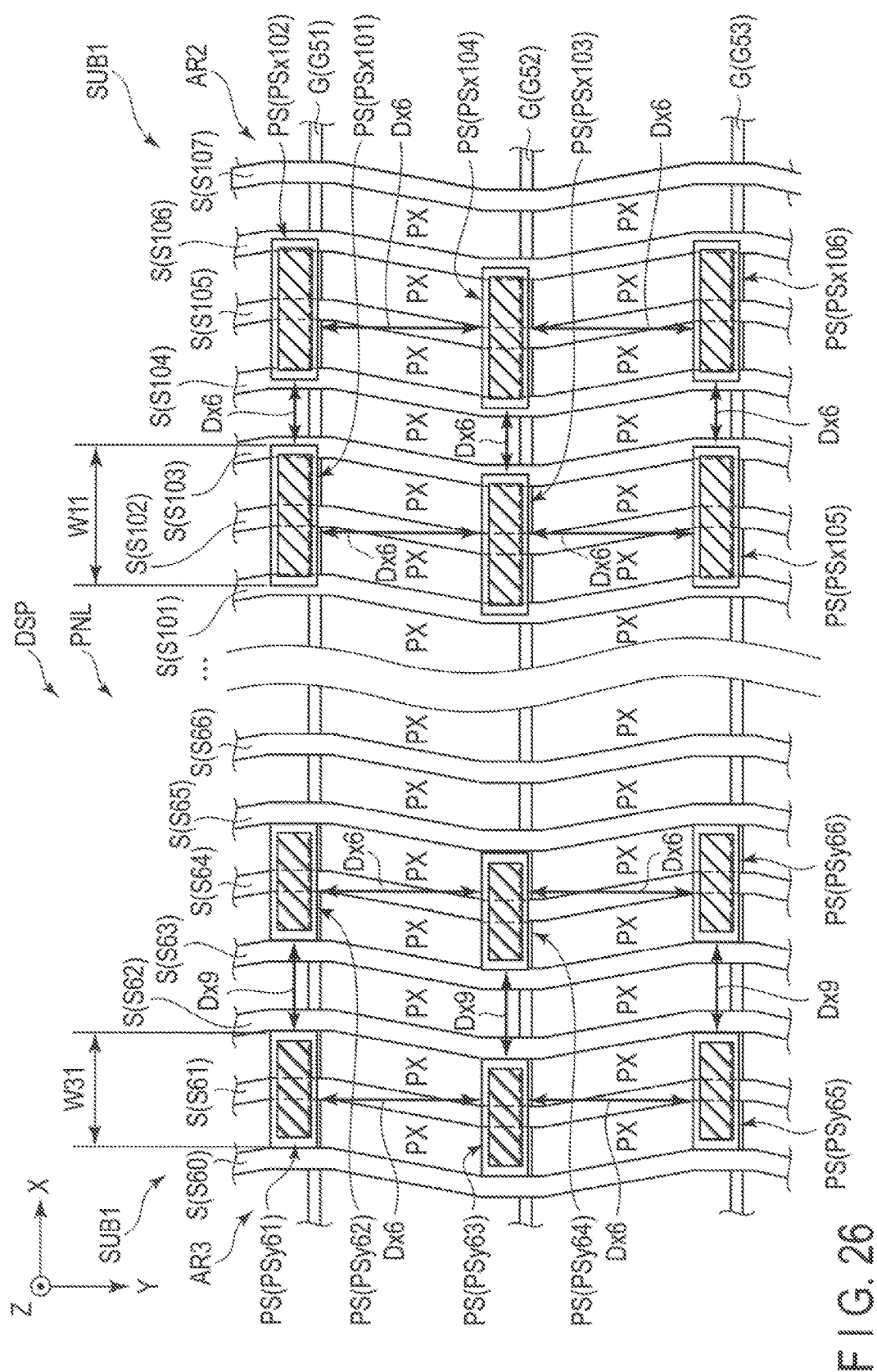
FIG. 26 is a plan view showing a configuration example of a second area and a third area of a display panel according to modification 6.

FIG. 26 is a plan view showing a configuration example of the second area AR2 and the third area AR3 of the display panel PNL according to modification 6. FIG. 26 shows an example of the arrangement of the spacer PS in the second area AR2 and an example of the arrangement of the spacer PS in the third area AR3 of the display panel PNL. FIG. 26 shows a part of the configuration example of the third area AR3 on the left side and a part of the configuration example of the second area AR2 on the right side. The arrangement of the spacer PS of the second area AR2 shown in FIG. 26 is similar to the arrangement of the spacer PS of the second area AR2 shown in FIG. 23, and therefore detailed description thereof will be omitted. Further, although not shown in the drawing, the arrangement of the spacer PS of the first area AR1 in FIG. 26 is assumed to be similar to the arrangement of the spacer PS of the first area AR1 shown in FIG. 23.

The display device DSP according to modification 6 differs from the display device DSP shown in FIG. 23 in that the width in the first direction X of the spacer PS arranged in the third area AR3 differs from the width in the first direction X of the spacer PS arranged in the first area AR1 and the width in the first direction X of the spacer PS arranged in the second area AR2.

In the third area AR3, the spacer PS has the shape of a rectangle in which a width thereof in the first direction X is greater than a width thereof in the second direction Y. The width in the first direction X of the spacer PS arranged in the third area AR3 is less than the width in the first direction X of the spacer PS arranged in the second area AR2 and is greater than the width in the first direction X of the spacer PS arranged in the first area AR1. In the example illustrated, in the second area AR2 and the third area AR3, the centers of the spacers PS in the first direction X are located at the same distance as each other in the first direction X. Further, in the second area AR2 and the third area AR3, the centers of the spacers PS in the second direction Y are located at the same distance as each other in the second direction Y. A width W31 in the first direction X of the spacer PS arranged in the third area AR3 is less than the width W11. Further, the width W31 is greater than the width W21. Therefore, even if the spacers PS are arranged in similar manners among the first area AR1, the second area AR2 and the third area AR3, the distance between two spacers PS which are adjacent to each other in the first direction X in the third area AR3 is greater than the distance between two spacers PS which are adjacent to each other in the first direction X in the second area AR2, and is less than the distance between two spacers PS which are adjacent to each other in the first direction X in the first area AR1. As long as the density of the spacers arranged in the third area AR3 is less than the density of the spacers arranged in the second area AR2 and is greater than the density of the spacers arranged in the first area AR1, the spacers PS may be arranged in different manners among the first area AR1, the second area AR2 and the third area AR3.

In the example illustrated, a spacer PSy61 overlaps the intersection of a signal line S61 and the scanning line G51. A spacer PSy62 overlaps the intersection of a signal line S64 and the scanning line G51. A spacer PSy63 overlaps the intersection of the signal line S61 and the scanning line G52. A spacer PSy64 overlaps the intersection of the signal line S64 and the scanning line G52. A spacer PSy65 overlaps the intersection of the signal line S61 and the scanning line G53. A spacer PSy66 overlaps the intersection of the signal line S64 and the scanning line G53.

The spacer PSy61 and the spacer PSy62 are located at a distance Dx9 from each other in the first direction X. The spacer PSy63 and the spacer PSy64 are located at the distance Dx9 from each other in the first direction X. The spacer PSy65 and the spacer PSy66 are located at the distance Dx9 from each other in the first direction X. The distance Dx9 is greater than the distance Dx6 and is less than the distance Dx7. Further, the spacer PSy61 and the spacer PSy63 are located at the distance Dy6 from each other in the second direction Y. The spacer PSy63 and the spacer PSy65 are located at the distance Dy6 from each other in the second direction Y. The spacer PSy62 and the spacer PSy64 are located at the distance Dy6 from each other in the second direction Y. The spacer PSy64 and the spacer PSy66 are located at the distance Dy6 from each other in the second direction Y.

According to modification 6, advantages similar to those of the previously-described embodiment can be obtained.

In modification 6, the widths in the first direction X of the spacers PS arranged in the first area AR1 and the second area AR2 are different from the width in the first direction of the spacer PS X arranged in the third area AR3. Instead, the widths in the second direction Y of the spacers PS arranged in the first area AR1 and the second area AR2 may be different from the width in the second direction Y of the spacer PS arranged in the third area AR3. In this case, for example, the spacer PS has the shape of a rectangle in which a width thereof in the second direction Y is greater than a width thereof in the first direction X in the first area AR1, the second area AR2 and the third area AR3.

Figure 27:
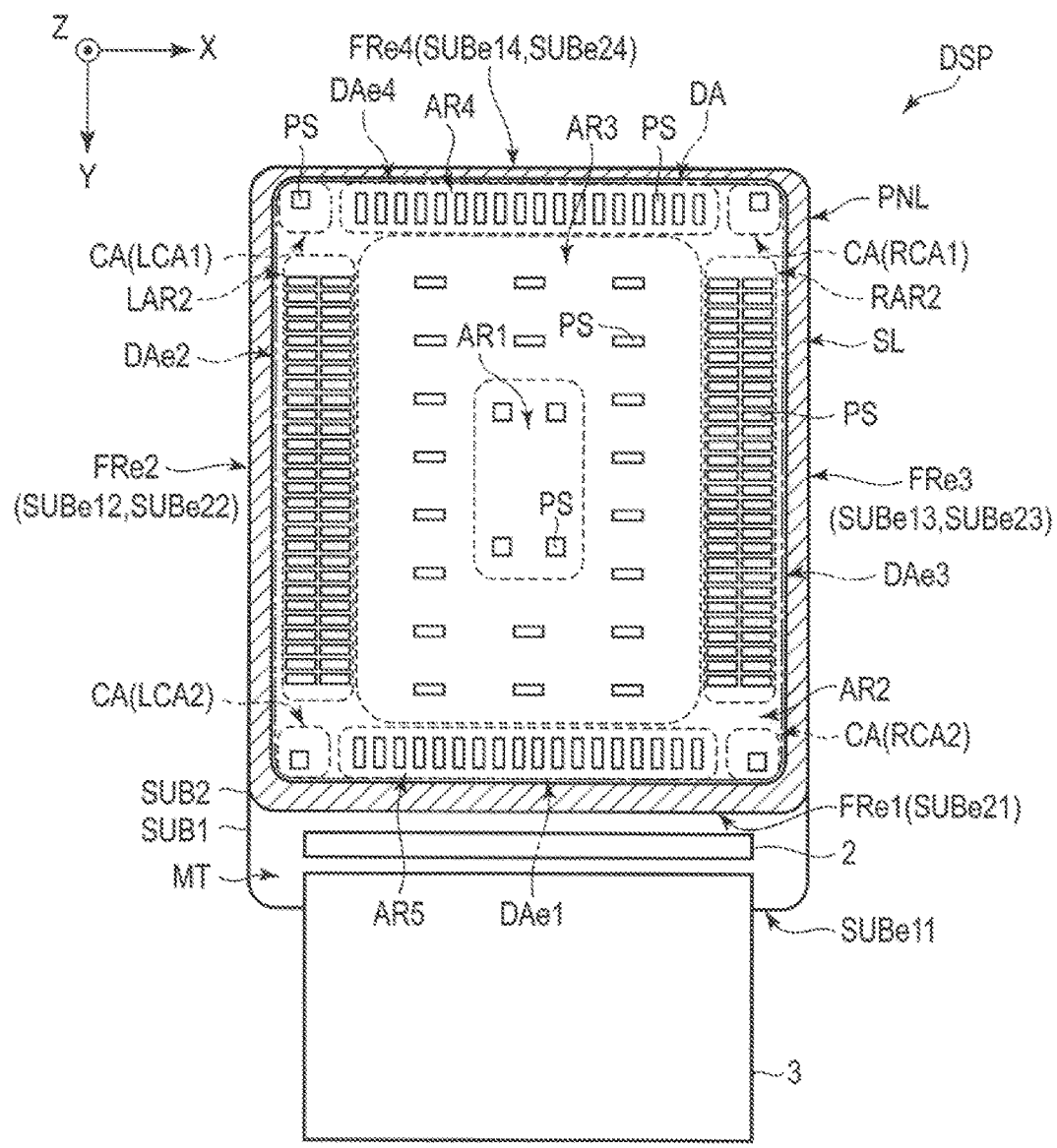
FIG. 27 is a plan view showing a configuration example of a display panel according to modification 7.

FIG. 27 is a plan view showing a configuration example of the display panel PNL according to modification 7. FIG. 27 shows an example of the arrangement of the spacer PS in the display panel PNL.

The display device DSP according to modification 7 differs from the previously-described display device DSP in the arrangement of the spacer PS.

In the example illustrated, the spacer PS has the shape of a rectangle in the first area AR1. For example, the spacer PS shown in FIG. 12 is arranged in the first area AR1. The second area AR2 has a right area RAR2, a left area LAR2, a fourth area AR4, a fifth area AR5 and the corner area CR. The spacer PS extends in the first direction X in the right area RAR2 and the left area LAR2. For example, the spacer PS shown in FIG. 18 is arranged in the right area RAR2 and the left area LAR2. Further, the spacer PS extends in the second direction Y in the fourth area AR4 and the fifth area AR5. For example, the spacer PS shown in FIG. 5 is arranged in the fourth area AR4 and the fifth area AR5.

According to modification 7, advantages similar to those of the previously-described embodiment can be obtained.

Figure 28:
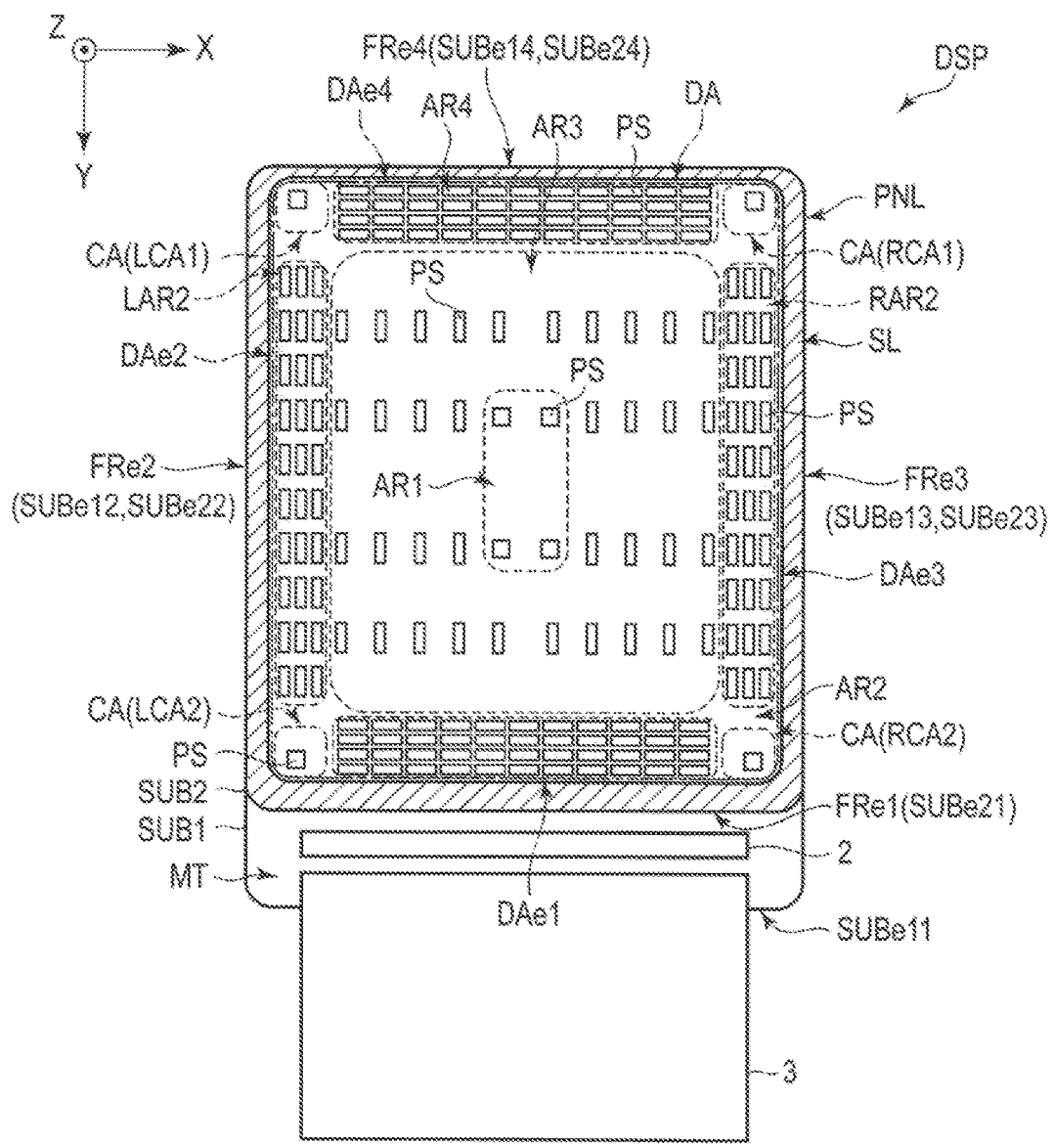
FIG. 28 is a plan view showing a configuration example of a display panel according to modification 8.

FIG. 28 is a plan view showing a configuration example of the display panel PNL according to modification 8. FIG. 28 shows an example of the arrangement of the spacer PS in the display panel PNL. The display device DSP according to modification 8 differs from the display device DSP shown in FIG. 27 in the arrangement of the spacer PS.

In the example illustrated, the spacer PS extends in the second direction Y in the right area RAR2 and the left area LAR2. For example, the spacer PS shown in FIG. 5 is arranged in the right area RAR2 and the left area LAR2. Further, the spacer PS extends in the first direction X in the fourth area AR4 and the fifth area AR5. For example, the spacer PS shown in FIG. 18 is arranged in the fourth area AR4 and the fifth area AR5.

According to modification 8, advantages similar to those of the previously-described embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposed to the first substrate;
a sealant which attaches the first substrate and the second substrate together; and
a spacer located between the first substrate and the second substrate, wherein
the first substrate and the second substrate in an area surrounded by the sealant comprises a first area, a second area located between the sealant and the first area, and a third area between the first area and the second area,
the spacer is formed of a recess and a projection opposed to the recess, and includes a plurality of first spacers located in the first area, a plurality of second spacers located in the second area, and a plurality of third spacers located in the third area,
the first spacers are located at a first distance from each other in a first direction, and are located at a fourth distance from each other in a second direction intersecting the first direction,
the second spacers are located at a second distance from each other in the first direction, and are located at a fifth distance from each other in the second direction,
the third spacers are located at a third distance from each other in the first direction, and are located at a sixth distance from each other in the second direction,
the second distance is less than the first distance,
the third distance is less than the first distance and is greater than the second distance,
the fifth distance is less than the fourth distance, and
the sixth distance is less than the fourth distance and is greater than the fifth distance.

2. The display device of claim 1, wherein
a width of the first spacers in the first direction is a first width,
a width of the second spacers in the first direction is a second width, and
the second width is greater than or equal to the first width.

3. The display device of claim 1, further comprising signal lines extending in a second direction intersecting the first direction, and
the first spacers and the second spacers extend along the signal lines, respectively.

4. The display device of claim 1, wherein
the first spacers are located at a third distance from each other in a second direction intersecting the first direction,
the second spacers are located at a fourth distance from each other in the second direction, and
the fourth distance is less than the third distance.

5. The display device of claim 1, further comprising a cover member having a curved portion and a flat portion, wherein
the first area is located in the flat portion, and
the second area is located in the curved portion.

6. The display device of claim 1, wherein a tip portion of the projection contacts a bottom portion of the recess.

7. The display device of claim 6, wherein
the first substrate comprises an insulating substrate, an organic insulating film located above the insulating substrate, an insulating film located above the organic insulating film, an alignment film located above the insulating film, a signal line located between the insulating substrate and the organic insulating film, and the recess,
the second substrate comprises the projection, and
the recess is formed across the alignment film, the insulating film and the organic insulating film above the signal line.

* * * * *